(12) United States Patent
Nakai

(10) Patent No.: US 6,266,049 B1
(45) Date of Patent: Jul. 24, 2001

(54) ONE-CHIP MICROCOMPUTER SYSTEM

(75) Inventor: Shizuo Nakai, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/148,308

(22) Filed: Sep. 4, 1998

(30) Foreign Application Priority Data

Sep. 5, 1997 (JP) .................................................. 9-241388

(51) Int. Cl.$^7$ ..................................................... G09G 5/00
(52) U.S. Cl. ........................... 345/168; 345/169; 341/20; 341/22; 341/26
(58) Field of Search .................... 345/519, 168, 345/169; 341/26, 22, 20

(56) References Cited

U.S. PATENT DOCUMENTS

| 3,990,070 | 11/1976 | Spence | 345/519 |
|---|---|---|---|
| 4,188,626 | 2/1980 | Brantingham et al. | 341/26 |
| 4,551,716 | 11/1985 | Saito et al. | 340/711 |
| 5,235,331 | 8/1993 | Saito | 341/26 |
| 5,459,462 | * 10/1995 | Venkidu | 341/22 |
| 5,708,227 | * 1/1998 | Kosugi | 341/26 |
| 5,892,459 | * 4/1999 | Ishimura | 341/26 |
| 5,914,677 | * 3/2000 | Ahmadian | 341/26 |
| 6,040,788 | * 3/2000 | Chambers et al. | 341/26 |

FOREIGN PATENT DOCUMENTS

| 59-185389 | 10/1984 | (JP) . |
|---|---|---|
| 59-185389 A | 10/1984 | (JP) . |
| 5-325720 | 12/1993 | (JP) . |
| 5-325720 A | 12/1993 | (JP) . |

OTHER PUBLICATIONS

Patent Abstracts of Japan vol. 018, No. 137 (E–1518), 3/1994 & JP 05 325720 (Fujitsu LTD), 12/1993.

* cited by examiner

Primary Examiner—Richard Hjerpe
Assistant Examiner—Ali Zamani
(74) Attorney, Agent, or Firm—Nixon & Vanderhye P.C.

(57) ABSTRACT

A one-chip microcomputer system of the present invention, includes: a display driving circuit for driving a display device, a scanning circuit for outputting a key scanning signal to scan a keyboard switch; a common pert used for scanning the keyboard switch, and driving the display device; and a controller for controlling parallel processing of scanning the keyboard switch and driving the display device.

10 Claims, 25 Drawing Sheets

PRIOR ART

ONE-CHIP MICROCOMPUTER SYSTEM

BACKGROUND OF THE INVENTION

1. Field of the Invention

The present invention relates to a one-chip microcomputer system, and more specifically to a one-chip microcomputer system which is mounted on an electronic register including a keyboard switch (keyboard matrix) and a display device such as a 7-segment light-emitting diode (LED) and a fluorescent display tube, a POS terminal device, a video tape recorder (VTR), and other electrical appliances.

2. Description of the Related Art

In apparatuses such as the above-mentioned electronic register, there has been a demand for a display device with high brightness and outstanding viewability, a miniaturized accommodating capacity, and a high-speed keyboard input. A conventional example which tries to satisfy such a demand is disclosed in Japanese Laid-open Publication Nos. 59-185389 and 5-325720.

Japanese Laid-open Publication No. 59-185389 discloses a miniaturized and inexpensive apparatus in which display control means and input control means are driven in time division.

Japanese Laid-open Publication No. 5-325720 discloses an inexpensive LED driving apparatus in which the number of components is reduced by driving an LED and scanning a keyboard switch in time division.

According to the above-mentioned prior arts, driving a display and scanning a keyboard switch are serially performed in a time sequence. Hereinafter, these prior arts will be described in detail.

FIG. 23 is a view showing a conventional one-chip microcomputer system. The one-chip microcomputer system includes a microcomputer 1000, a keyboard switch 2, and display LED modules 3, 4, and 5.

The keyboard switch 2 includes a number of switches S00 to S03, S10 to S13, and S20 to S23 arranged in a matrix. The display LED modules 3, 4, and 5 each have a similar configuration. The display LED module 3 will be described as an example. The display LED module 3 includes 7 LEDs D3-1 to D3-7. The LEDs D3-1 to D3-7 are connected in series to current restricting resistors R30 to R33 and R40 to R42, respectively. Anode sides of the LEDs D3-1 to D3-7 are collectively connected to transistors Q1, Q2, and Q3 which are driven with a select signal for selecting one of the display LED modules 3, 4, and 5. Cathode sides of the LEDs D3-1 to D3-7 are connected to segment driving ports P30 to P33 and P40 to P42. One end of each of base resistors R10, R11, and R12 are. connected to the transistors Q1, Q2, and Q3 for driving each LED, respectively. The other end of each of the base resistors R10, R11, and R12 are connected to output ports P10, P11, and P12 of the microcomputer 1000, respectively.

One end of each of diodes D10, D11, and D12 are connected between the base resistors R10, R11, and R12 and the output ports P10, P11, and P12. The other end of each of the diodes D10, D11, and D12 are connected to the keyboard switch 2. The diodes D10, D11 and D12 prevent failure caused by a short-circuit of the output ports P10, P11, and P12 in the case where two or more key switches are simultaneously pressed, as well as malfunction of a key input.

The leading ends of return lines from. the keyboard switch 2 are connected to ports P20, P21, P22, and P23 of the microcomputer 1000. A return signal is input from the keyboard switch 2 to the ports P20, P21, P22, and P23. Pull-up resistors R20, R21, R22, and R23 are connected in the middle of the return lines.

In the above-mentioned structure, the output ports P10, P11, and P12 work as the output ports of a select signal for a display, as well as the scanning output ports of the keyboard switch 2. The microcomputer 1000 sequentially transmits a select signal from the output ports P10, P11, and P12 in such a manner that a signal at only one port becomes a low level, and outputs an LED driving pattern synchronized with the transmitted select signal to the segment driving ports P30 to P33 and P40 to P42, whereby a display corresponding to each select is performed:

Furthermore, in scanning the keyboard switch 2, the microcomputer 1000 investigates an input pattern of the ports P20 to P23 to which a return signal is input from the keyboard switch 2 while one scanning signal is at a low level. Thus, it can be recognized which key switch is pressed.

FIG. 19 is a view showing an operation timing of the one-chip microcomputer system shown in FIG. 23.

The microcomputer 1000 outputs a select signal at a low level through the output port P10 at ti to select one of the display LED modules 3, 4, and 5. The microcomputer 1000 outputs LED driving signals from the segment driving ports P30 to P33 and P40 to P42 to display a number. A direction in which an LED driving signal travels may be reversed. At t2, all of the select signals output from the output ports P10 to P12 are turned off (high level). At t3, the subsequent select signal output from the output port P11 is turned on (low level), and LED driving signals for an LED corresponding to the select signal is output. Thereafter, a display is performed in a similar manner up to the select signal output from the output port P12.

Herein, a period in which no select signals are output is provided between t2 and t3. The purpose of this is to prevent a display pattern of the previous digit from being displayed for a short period of time during the subsequent digit after switching of a select signal. This period (between t2 and t3) corresponds to a blanking period. Accordingly, a display is processed during a period T1 from t1 to t7.

Next, during a period T2 from t9 to t12, the microcomputer 1000 turns off all the display patterns, and outputs a keyboard scanning signal to the output ports P10 to P12. Between t9 and t10, the microcomputer 1000 reads an ON/OFF state of the keyboard switch 2 corresponding to the select signal output from the output port P10 at a timing 81, through the ports P20, P21, P22, and P23. Thereafter, in a similar manner, the microcomputer 1000 reads an ON/OFF state of the keyboard switch 2 corresponding to the select signal output from the output port P11 at a timing 82 and reads an ON/OFF state of the keyboard switch 2 corresponding to the select signal output from the output port P12 at a timing S3.

As described above, in the one-chip microcomputer system shown in FIG. 23, driving of a display and scanning of a keyboard matrix are serially performed in a time sequence.

A control system in which driving a display and scanning a keyboard switch are serially performed in a time sequence has the following problems.

Since a drive duty ratio of a display is decreased by the period T2, a high-brightness LED which is expensive and difficult to obtain should be used.

SUMMARY OF THE INVENTION

A one-chip microcomputer system of the present invention includes: a display driving circuit for driving a display device; a scanning circuit for outputting a key scanning signal to scan a keyboard switch; a common port used for scanning the keyboard switch and driving the display device; and a controller for controlling parallel processing of scanning the keyboard switch and driving the display device.

In one embodiment of the present invention, the display driving circuit includes a division section for time-dividing information displayed on the display device on a digit basis and a division section for time-dividing information displayed on the display device on a segment basis, and the system further includes a switch for selectively switching the division sections.

In another embodiment of the present invention, the above-mentioned one-chip microcomputer system further includes a counter for measuring a predetermined period of time from an ON timing of a display scanning signal output from the display driving circuit, wherein the controller detects an output signal from the counter.

In another embodiment of the present invention, the above-mentioned one-chip microcomputer system includes: a memory for storing a key return signal output from the keyboard switch, not through the controller; an interrupt signal generator for generating an interrupt signal for informing the controller of the key return signal being stored in the memory; and an interrupt generator for generating an interrupt when a key scanning of the keyboard switch is completed over one frame.

In another embodiment of the present invention, the above-mentioned one-chip microcomputer system includes: an input port for receiving the key return signal from the keyboard switch; a driving circuit for forcefully driving the input port at a non-active level, when the key scanning signal is in an OFF state; and an electric potential fixing unit for fixing an input level of the input port.

Hereinafter, the function of the present invention will be described.

According to the present invention, a part of the ports for scanning a keyboard switch is used for controlling a display, whereby scanning the keyboard switch and driving a display device are performed in parallel. In this structure, a total time required for driving a display and scanning the keyboard (i.e., total frame period) can be shortened. Therefore, a display can be driven with a high duty ratio, and the keyboard switch can be scanned at a high speed.

Furthermore, a display driving circuit for driving a display device includes a division section for time-dividing information displayed on the display device on a digit basis, a division section for time-dividing information displayed on the display device on a segment basis, and a switch for selectively switching the division sections. Therefore, when the number of segments is larger than the number of digits, a display can be driven with a higher duty ratio by time-dividing display on a segment basis, compared with the case where a display is driven in time division on a digit basis. Furthermore, a time-division display on a segment basis and a time-division display on a digit basis can be switched. Therefore, in the case where the number of digits is smaller than that of segments, time-division driving on a digit basis as in a conventional example can be performed, and in the case where the number of digits is larger than that of the segments, time-division driving on a segment basis can be performed.

In addition, according to the above-mentioned structure, a time-division system on a digit basis or a time-division system on a segment basis can be selected, so that an identical one-chip microcomputer can be used among different equipment. Thus, display driving suitable for a display device can be selected.

Furthermore, the one-chip microcomputer system includes a counter for measuring a predetermined period of time which can be arbitrarily programmed from an ON timing of a display scanning signal supplied from the display driving circuit, and an output from the counter is detected by a CPU. According to this structure, the above-mentioned period Tf can be automatically measured by hardware (i.e., CPU) in synchronization with a change in a scanning signal of a key. Therefore, the structure of software can be simplified, and productivity thereof can be enhanced.

Furthermore, the one-chip microcomputer system of the present invention includes: a memory for storing a key return signal output from the keyboard switch, not through the CPU; an interrupt signal generator for generating an interrupt signal for informing the CPU of the key return signal being stored in the memory; and an interrupt generator for generating an interrupt when a key scanning of the keyboard switch is completed over one frame. According to this Structure, a return signal from the keyboard switch during one frame of scanning of the keyboard switch can be read by the CPU, so that a CPU load and a development burden of software can be reduced.

In addition, according to the above-mentioned structure, an interrupt is generated by the CPU per scanning of the keyboard switch, whereby special keyboard scanning processing becomes possible. Furthermore, if interrupt processing per scanning of the keyboard switch is made divertible to an interval timer, an application range of hardware of the microcomputer is not required to be dedicated to scanning of the keyboard switch. Therefore, flexibility (i.e., degrees of design freedom) of the one-chip microcomputer system can be enhanced. As a result, a meek ROM required for scanning the keyboard switch can be omitted, and an inexpensive control device of a display key which enables high-speed processing can be realized.

Furthermore, the one-chip microcomputer system of the present invention includes a driving circuit for forcefully driving an input port for a key return signal from the keyboard switch at a non-active level during an OFF period of a key scanning signal and an electric potential fixing unit for fixing an input level of high-impedance input. According to this structure, a period Tf is shortened as is apparent from the embodiments described later. In addition, a low-impedance driving circuit can forcefully drive the input port, restrictions of impedance of pull-up resistors are eliminated, and a built-in load circuit of the one-chip microcomputer can be used. Therefore, an inexpensive and high-speed key input device can be realized.

Thus, the invention described herein makes possible the advantages of (1) providing a one-chip microcomputer system in which a circuit used for the some purposes as those in a conventional example can be used for driving a signal and scanning a keyboard switch in parallel, and a high display duty ratio and high-speed scanning of a keyboard switch can be realized; (2) providing a one-chip microcomputer system in which a time-division display on a segment basis and a time. division display on a digit basis can be switched, and a high display duty ratio can be realized, and which can be used among different equipment: (3) providing an inexpensive one-chip microcomputer system in which the load of software can be reduced, and a high-speed display and key scanning are realized; (4) providing an inexpensive one-chip microcomputer system in which hardware (i.e., the load of a microcomputer) can be reduced, a built-in mask ROM required for scanning a keyboard switch can be deleted, and a high-speed display and key scanning are realized; and (5) providing a one-chip microcomputer system in which equipment can be miniaturized and. made inexpensive.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

EMBODIMENT 1

A one-chip microcomputer system of Embodiment 1 of the present invention will be described with reference FIGS. 1A, 1B, and 2 to 4.

Figure 1A:
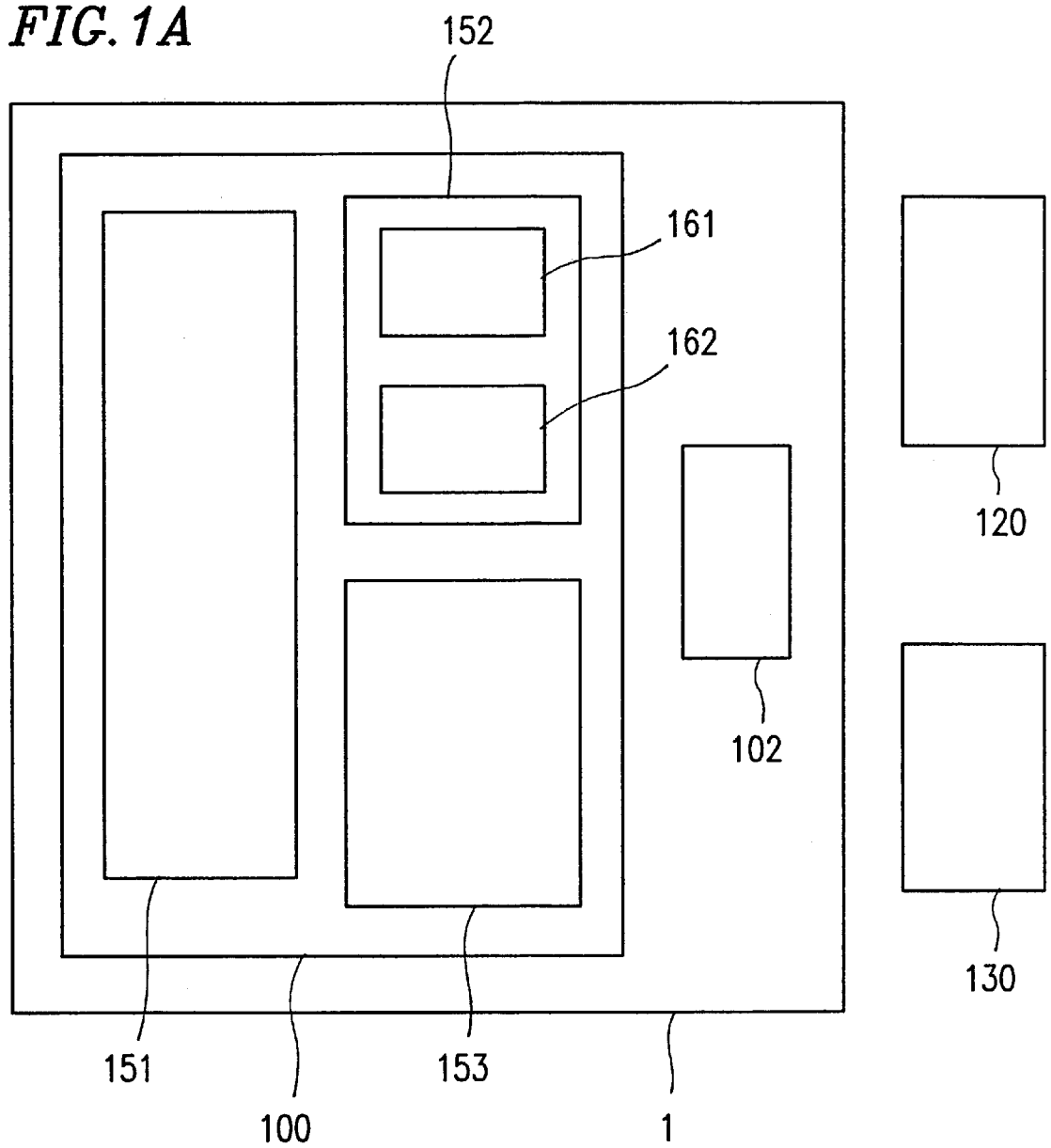
FIG. 1A is a view showing an example of a one-chip microcomputer system of the present invention.

FIG. 1A shows an example of the one-chip microcomputer system of Embodiment 1.

The one-chip microcomputer system of Embodiment 1 shown in FIG. 1A includes a microcomputer 1, a keyboard switch 120, and a display device 130 such as a 7-segment LED and a fluorescent display tube. The microcomputer 1 includes a CPU 100 and a common port 102 for scanning the keyboard switch 120 and controlling the display device 130. The CPU 100 uses the common port 102 and other ports (not shown) to scan the key switch 120 and control the display device 130. Furthermore, the CPU 100 determines which key is specified by the keyboard switch 120, based on the results of scanning.

In order to perform the above-mentioned operation, the CPU 100 includes a display driving circuit 152 for driving the display device 130, a scanning circuit 153 for scanning the keyboard switch 120, and a control unit 151 for controlling the display driving circuit 152 and the scanning circuit 153 for the purpose of scanning the keyboard switch 120 and controlling a display operation of the display device 153 in parallel. The scanning circuit 153 sends a scanning signal to the keyboard switch 120 at a previously determined timing for the purpose of detecting which key in the keyboard switch 120 is selected (pressed). A key return signal output from the keyboard switch 120 is stored in a storage unit (not shown). A key return signal represents an ON state or an OFF state of a key. A key return signal may be stored in the storage unit, not through the CPU 100.

Furthermore, the display driving circuit 152 includes at least one of a unit 161 for driving the display device 130 in time division on a digit basis and a unit 162 for driving the display device 130 in time division on a segment basis. In the case where the display driving circuit 152 includes the unit 161 and the unit 162, the control unit 151 selectively switches therebetween.

The microcomputer 1 may further include a timer (not shown) for measuring a predetermined period of time from an ON timing of a display scanning signal supplied from the display driving circuit 152 which drives the display device 130. The CPU 100 can detect an output from the timer. The predetermined period of time can be arbitrarily programmed.

The microcomputer 1 may further include a signal generator for generating an interrupt signal which informs the CPU 100 of that a key return signal representing the state of a key is taken in. An interrupt signal is generated every time a key return signal is stored in the storage unit.

The microcomputer 1 may further include an interrupt generating unit for generating an interrupt at the time when one frame of key scanning described later is completed.

Furthermore, the microcomputer 1 may include a driving circuit for forcefully driving an input port of a key return signal from the keyboard switch 120 to a non-active level during an OFF period of a key scanning signal and an electric potential fixing unit for fixing an input level at a high impedance.

Figure 1B:
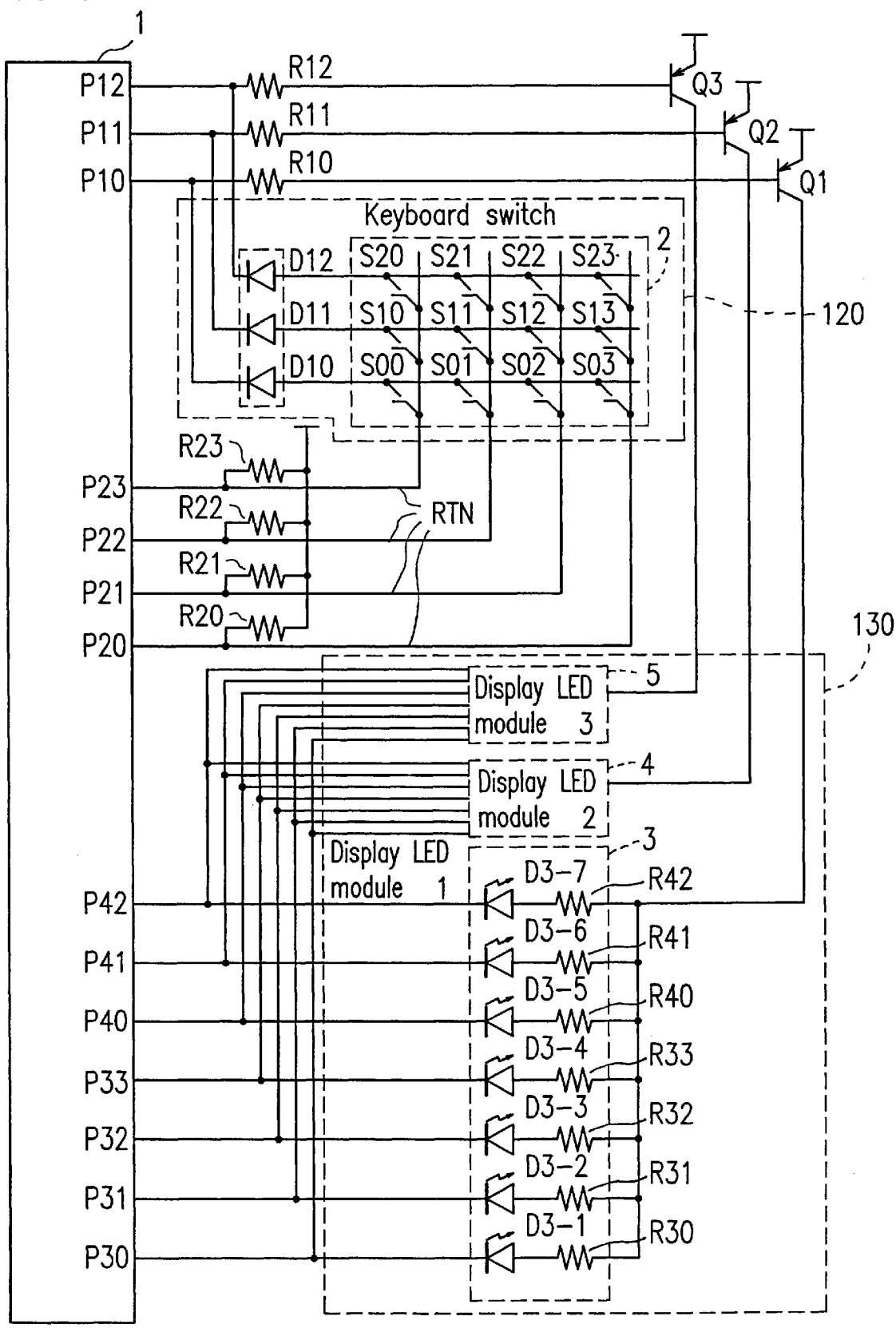
FIG. 1B is a diagram showing the details of a key switch and a display device of the one-chip microcomputer system shown in FIG. 1A.

Hereinafter, a schematic configuration of the one-chip microcomputer system shown in FIG. 1A will be described. FIG. 1B shows the details of the key switch 120 and the display device 130 of the one-chip microcomputer system shown in FIG. 1A.

This one-chip microcomputer system includes a microcomputer 1, a keyboard switch 2 corresponding to the keyboard switch 120, and display LED modules 3, 4, and 5 corresponding to the display device 130.

The keyboard switch 2 includes a number of switches S00 to S03, S10 to S13, and S20 to S23 arranged in a matrix. The display LED modules 3, 4, and 5 each have a similar configuration. The display LED module 3 will be described as an example. The display LED module 3 includes 7 LEDs D3-1 to D3-7. The LEDs D3-1 to D3-7 are connected in series to current restricting resistors R30 to R33 and R40 to R42, respectively. Anode sides of the LEDs D3-1 to D3-7 are collectively connected to transistors Q1, Q2, and Q3 which are driven with a select signal for selecting one of the display LED modules. Cathode sides of the LEDs D3-1 to D3-7 are connected to segment driving ports P30 to P33 and P40 to P42. In the display LED modules 3, 4, and 5 shown in FIG. 1B, a current flows from the transistors Q1, Q2, and Q3 to the segment driving ports P30 to P33 and P40 to P42. However, as long as a number can be displayed on a display, a current may be directed to flow in reverse. In this case, it is required that the transistors and the LEDs are appropriately modified.

One end of each of base resistors R10, R11, and R12 are connected to the transistors Q1, Q2, and Q3 for driving each LED, respectively. The other end of each of the base resistors R10, R11, and R12 are connected to output ports P10, P11, and P12 of the microcomputer 1, respectively.

One end of each of diodes D10, D11, and D12 are connected between the base resistors R10, R11, and R12 and the output ports P10, P11, and P12. The other end of each of the diodes D10, D11, and D12 are connected to the keyboard 2. The diodes D10, D11 and D12 prevent failure caused by a short-circuit of the output ports P1, P11, and P12 in the case where two or more key switches are simultaneously pressed, as well as malfunction of a key input.

The leading ends of return lines from the keyboard switch 2 are connected to ports P20, P21, P22, and P23 of the microcomputer 1. A return signal is input from the keyboard switch 2 to the ports P20, P21, P22, and P23. Pull-up resistors R20, R21, R22, and R23 are connected in the middle of the return lines.

In the one-chip microcomputer system of Embodiment 1, the one-chip microcomputer 1 is different from that of the conventional example. However, the object (keyboard switch or display device) to be controlled by the one-chip microcomputer is the same as in the conventional example.

A configuration of the microcomputer 1 will be described with reference to FIG. 2. The microcomputer 1 includes a CPU 100, Port 1 (1-2) to Port 4 (1-5), a timer unit 1-6, a RAM 1-7, a ROM 1-8, and a clock generator (CG) 1-9. The CPU 100 is connected to these peripheral devices 1-2 to 1-8 through an internal data bus line 1-10 and a control bus line 1-11.

The CPU 100 is a control center of the one-chip microcomputer system, and control is effected in accordance with a program stored in the ROM 1-8 as described later. The Port 1 (1-2) to Port 4 (1-5) correspond to the ports P10 to P12, P20 to P23, P30 to P33, and P40 to P42 in FIG. 1B, respectively. The timer unit 1-6 is mainly used for determining a time. The CG 1-9 supplies a clock to a device in the one-chip microcomputer 1, such as the CPU 100 and the timer unit 1-6.

In the above-mentioned system configuration, the CPU 100 controls the control bus line 1-11, and data is transmitted/received between the CPU 100 and the peripheral devices 1-2 to 1-8 through the internal data bus line 1-10 in accordance with this control.

Next, an operation timing of the one-chip microcomputer system of Embodiment 1 will be described with reference to FIG. 3. The operation timing is set in accordance with a program stored in the ROM 1-8. It is noted that "P2read" in FIG. 3 represents a timing at which an instruction for reading a signal from the Port 2 (1-3) is executed.

Figure 3:
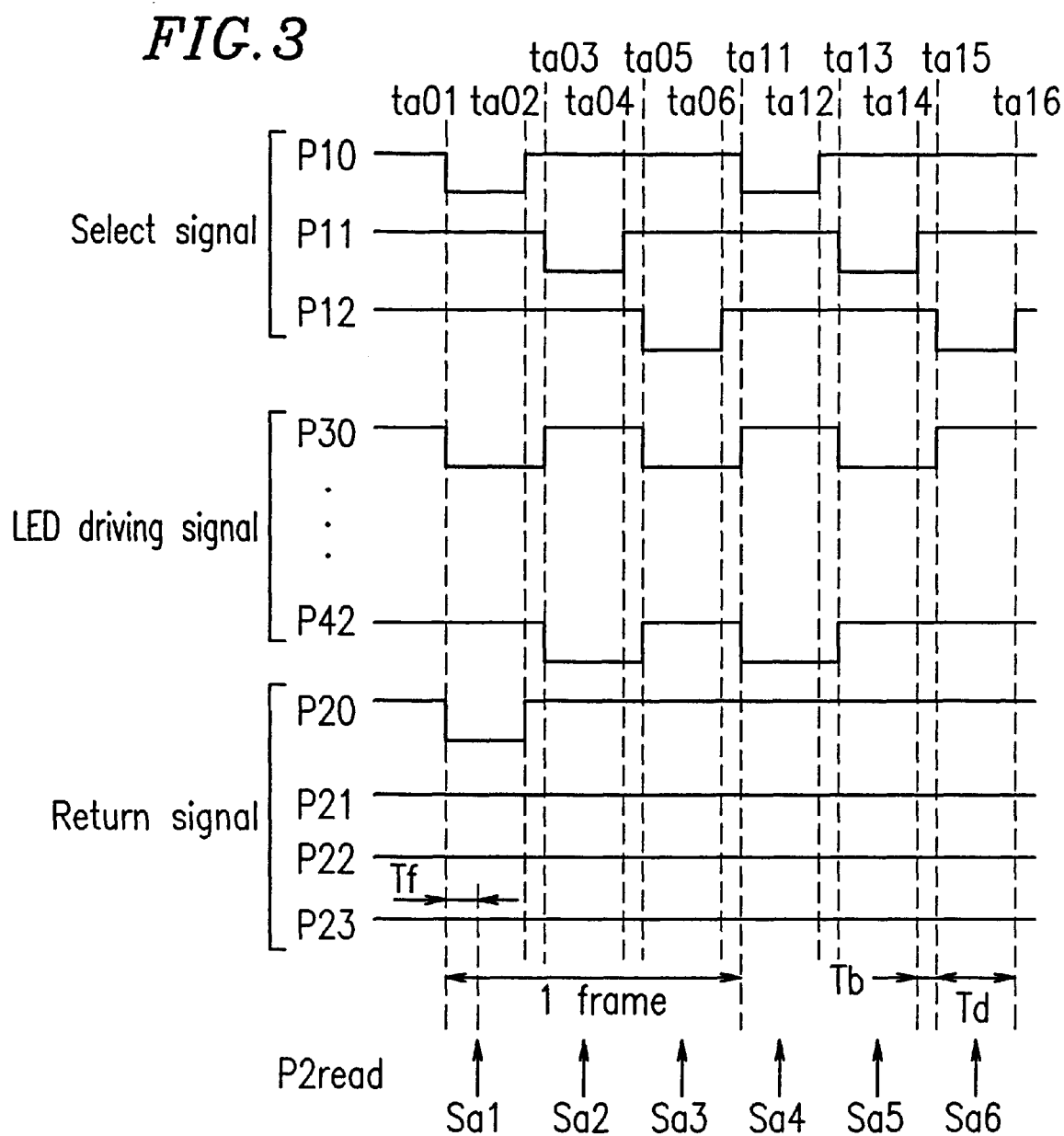
FIG. 3 is a diagram showing an example of an operation timing of a one-chip microcomputer system of Embodiment 1.

In FIG. 3, the CPU 100 turns on a select signal (low level) output from the output port P10 at ta01 and changes states of the segment driving ports P30 to P42 in such a manner that a display pattern is displayed on a display LED module corresponding to the select signal output from the output port P10. For simplicity, an expression "a signal is transmitted from the segment driving ports P30 to P42" is used. This expression means that the segment driving ports P30 to P42 receive/output a signal. This is because a signal flow is not characterized by its direction, but by whether a display LED module is lit up or turned off by the transmission of a signal.

When a time period Tf elapses from ta01, a return signal is read at a timing Sa1 from the keyboard switch 2 corresponding to the select signal output from the output port P10.

Next, the CPU 100 turns off the select signal (high level) output from the output port P10 at ta02. All of the select signals are turned off during a period from ta02 to ta03. This period is a blanking period of a display.

Similarly, the CPU 100 turns on a select signal (low level) output from the output port P11 at ta03, and reads a return signal from the keyboard switch 2 at a timing Sa2. Then, a select signal output from the output port P12 is processed in a similar manner, and processing of one frame is completed at ta11. A period from ta01 to ta11 corresponds to one frame. Thereafter, the second frame, third frame, . . . are processed.

Next, a control procedure of the microcomputer 1 for performing the above-mentioned, operation timing, more specifically the CPU 100, will be described with reference to FIG. 4.

The CPU 100 reads a control program stored in the ROM 1-8. At Step S1, the CPU 100 initializes a software counter 107 (COUNT_DIG) disposed in a region on the RAM 1-7 to zero.

At Step S2, the CPU 100 stands by, waiting for the elapse of a blanking period Tb, based on time information from the timer unit 1-6. Upon confirming the elapse of the period Tb, at Step S3, the CPU 100 turns on only signals to be displayed among the segment driving signals output from the segment driving ports P30 to P33 and P40 to P42 of the current lighting display digit. Then, the CPU 100 turns on one of the select signals output from the output ports P10 to P12 which are being driven, based on the software counter 107 (COUNT_DIG), and restarts the timer unit 1-6 to proceed to Step S4.

At Step S4, the CPU 100 stands by, waiting for the elapse of a period Tf during which a return signal becomes readable from the keyboard switch 2, based on time information from the timer unit 1-6. Upon confirming the elapse of the period Tf, the CPU 100 proceeds to Step S5. The CPU 100 reads a return signal from the keyboard switch 2 through the ports P20 to P23, temporarily stores the return signal in a buffer (KDB) disposed in an area on the RAM 1-7, and restarts the timer unit 106 so as to measure a display driving period Td.

Then, the CPU 100 proceeds to Step S6, and stands by, waiting for the completion of the display driving period Td. The period (Td–Tf) is measured at Step S6 for the following seasons: the period Tf has already passed, so that a period of time which it takes for a display LED module to be turned off corresponds to the period (Td–Tf).

Upon confirming the elapse of the display driving period Td, the CPU 100 proceeds to Step S7. The CPU 100 turns off a select signal, restarts the timer unit 1-6 so as to measure a blanking period Tb, and increments the software counter 107 (COUNT_DIG) for the subsequent digit processing, to proceed to Step S8.

At Step S8, the CPU 100 determines whether or not digit scanning is completed up to the select signal output from the output port P12. This determination is based on whether or not a value of the software counter 107 (COUNT_DIG) becomes "3". In the case where all of the digits have not been processed at Step S8, the CPU 100 returns to Step S3 to restart the above-mentioned operation.

Upon confirming the completion of all of the digit processing at Step S8, the CPU 100 proceeds to Step 69. At Step S9, the CPU 100 determines a pressed state of the keyboard switch 2, based-on sampling data on a digit. basis of a return signal from the keyboard switch 2 temporarily stored in the buffer. Thereafter, the CPU 100 returns to Step S1, and restarts the processing at Steps S1 to S9.

In the one-chip microcomputer system of Embodiment 1, driving a display and scanning the keyboard switch 2 are performed in parallel. Therefore, a total time of a time required for a display and a time required for scanning the keyboard switch 2 (i.e., total frame time) can be shortened. Thus, a display can be driven at a high duty ratio, and the keyboard switch 2 can be scanned at a high speed.

EMBODIMENT 2

A one-chip microcomputer system of Embodiment 2 of the present invention will be described with reference to FIGS. 5 to 7. In the one-chip microcomputer system of Embodiment 2, a display is driven in time division on a-segment basis or on a digit basis.

Figure 5:
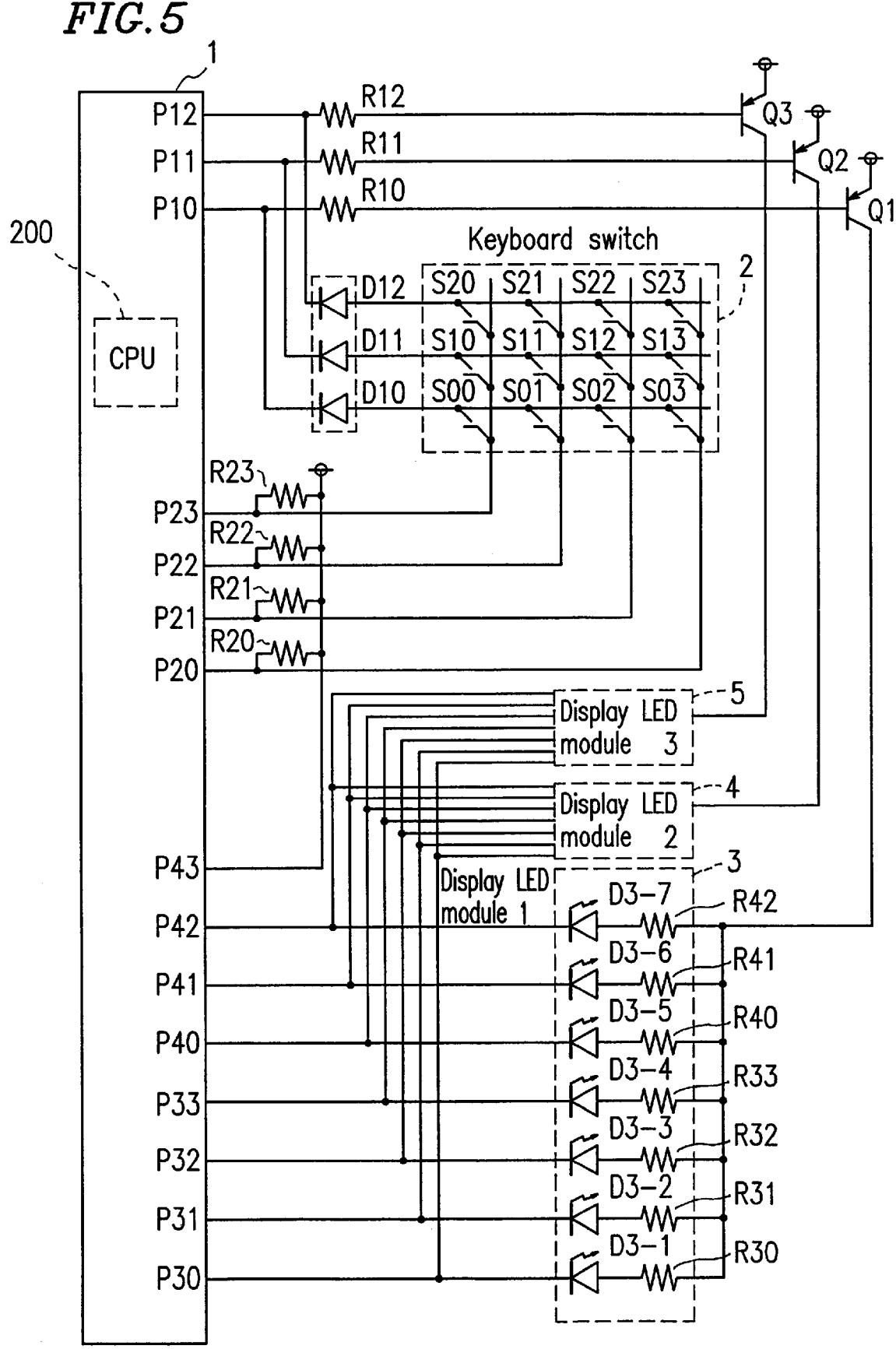
FIG. 5. is a diagram showing the one-chip microcomputer system of Embodiment 1.

FIG. 5 shows a circuit configuration of the one-chip microcomputer system of Embodiment 2 which is different from that of the one-chip microcomputer system of Embodiment 1 shown in FIG. 1 in that an additional segment driving port P43 connected to a power source is used in Embodiment 2.

Furthermore, the CPU 200 is different from the CPU 100 in a program for controlling a procedure of a display and scanning a keyboard switch. The details of the program will be described later. In FIG. 5, the components identical with those in FIG. 1 are denoted by the reference numerals identical with those therein.

Next, an operation timing of the one-chip microcomputer system of Embodiment 2 will be described with reference to FIG. 6.

Figure 6:
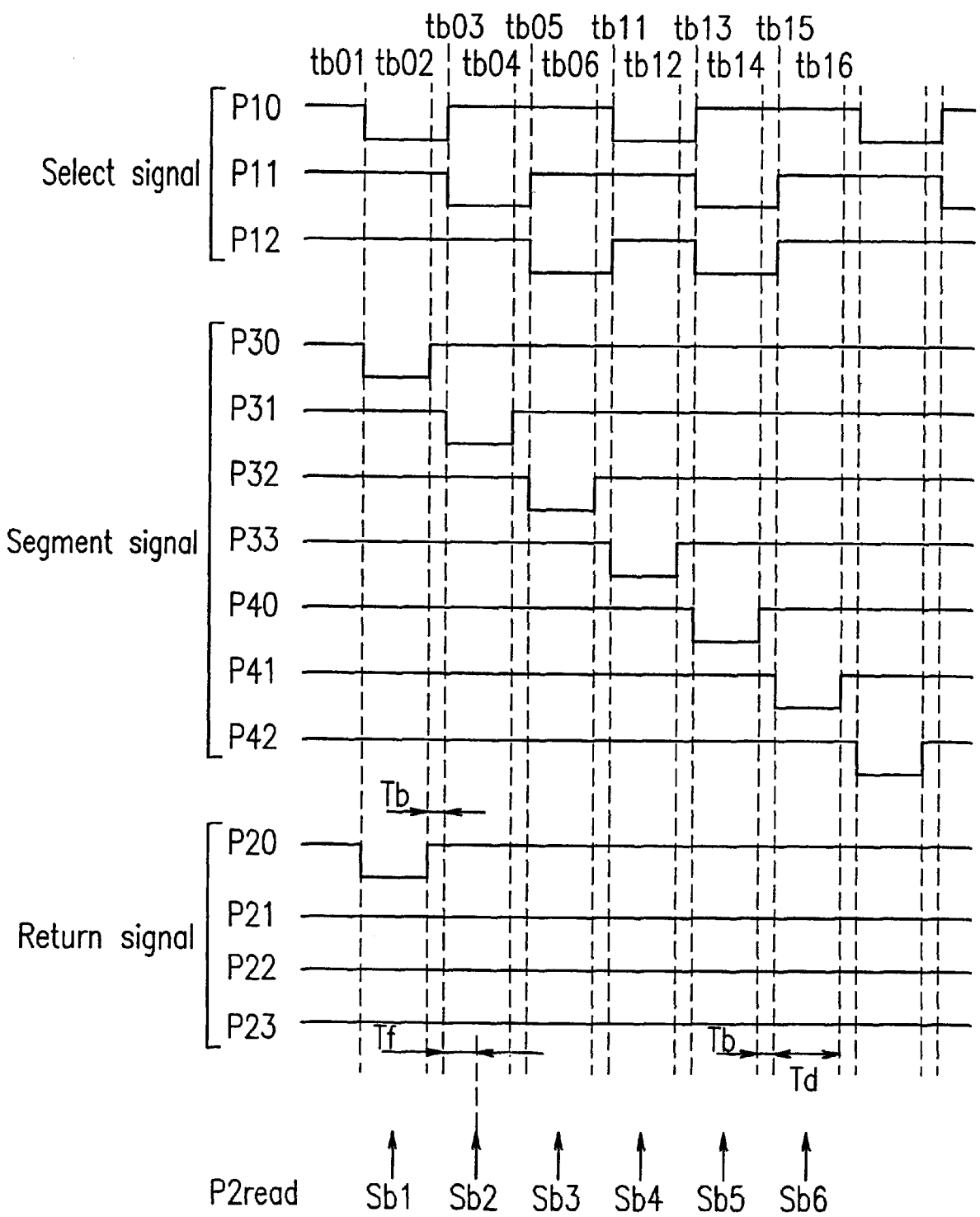
FIG. 6 is a diagram showing an example of an operation timing of a one-chip microcomputer system of Embodiment 2.
Figure 7:
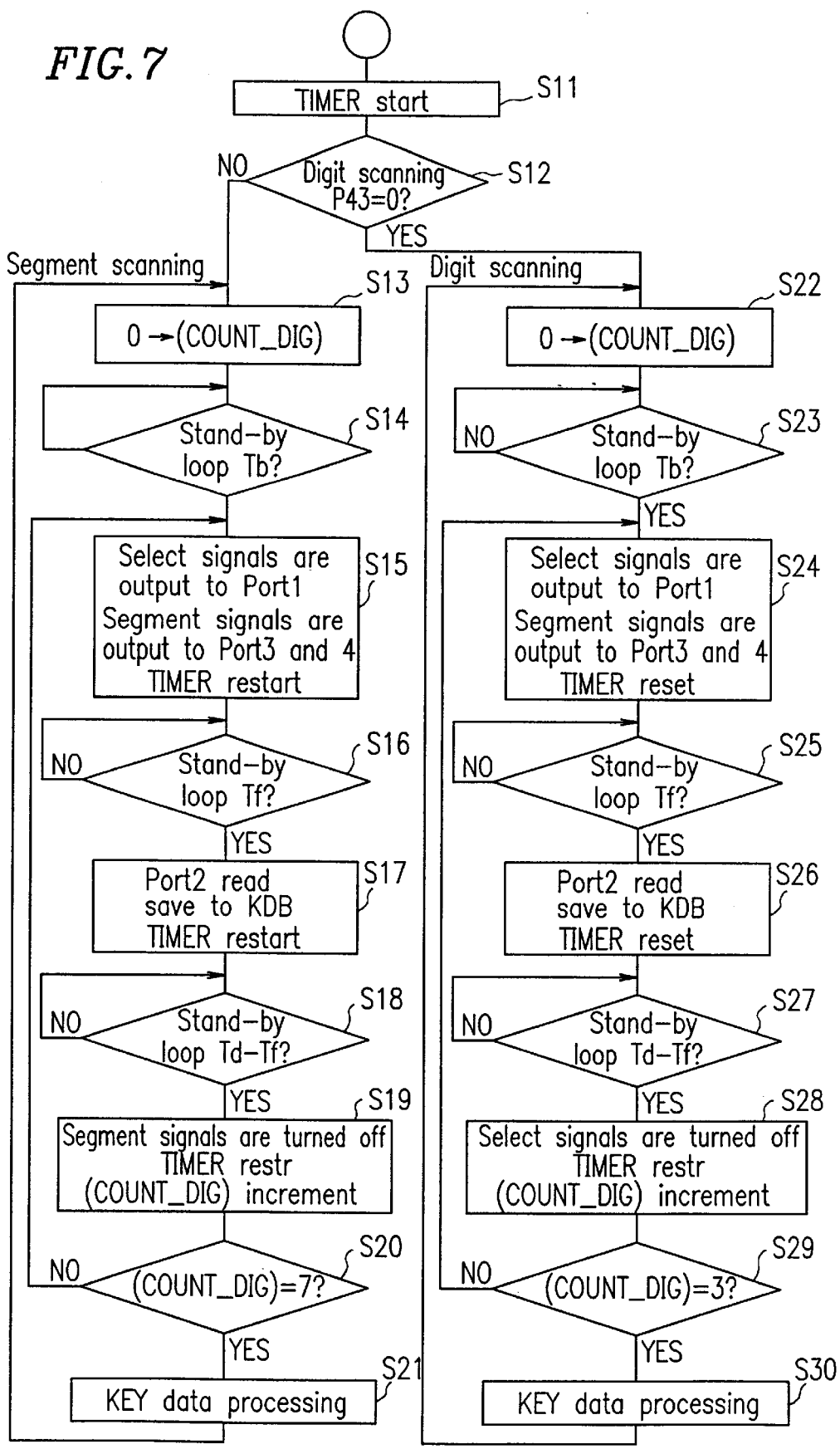
FIG. 7 is a flow chart showing an operation procedure of the one-chip microcomputer system of Embodiment 2.

In FIG. 6, the CPU 200 turns on a segment signal transmitted from a segment driving port P30 assigned to one of a 7-segment LED at tb01. The CPU 200 turns on a select signal for a digit corresponding to an LED which is to be lit up among three LEDs connected to the segment driving port P30. Thereafter, the CPU 200 reads a return signal from the keyboard switch 2 output from the ports P20 to P23 after the elapse of a period Tf (i.e., at a timing Sbl). Then, after the elapse of a period Td from tb01 (i.e., at tb02), all of the segment signals are turned off.

After the elapse of a display blanking period Th from tb02 (i.e., at tb03), the CPU 200 turns on the subsequent segment signal output from the segment driving portion P31. Thereafter, segment signals output from the segment driving portions P32, P33, P40, P41, and P42 are driven one by one in a similar manner.

In the present embodiment, for simplicity, the case where a display digit is 3 has been described. However, in the case where the number of display digits is larger than that of the total segments, a display duty close to 1/(number of segments) can be obtained irrespective of the number of digits.

Next, a control procedure of the CPU 200 for performing the above-mentioned operation timing will be described with reference to FIG. 7.

Figure 2:
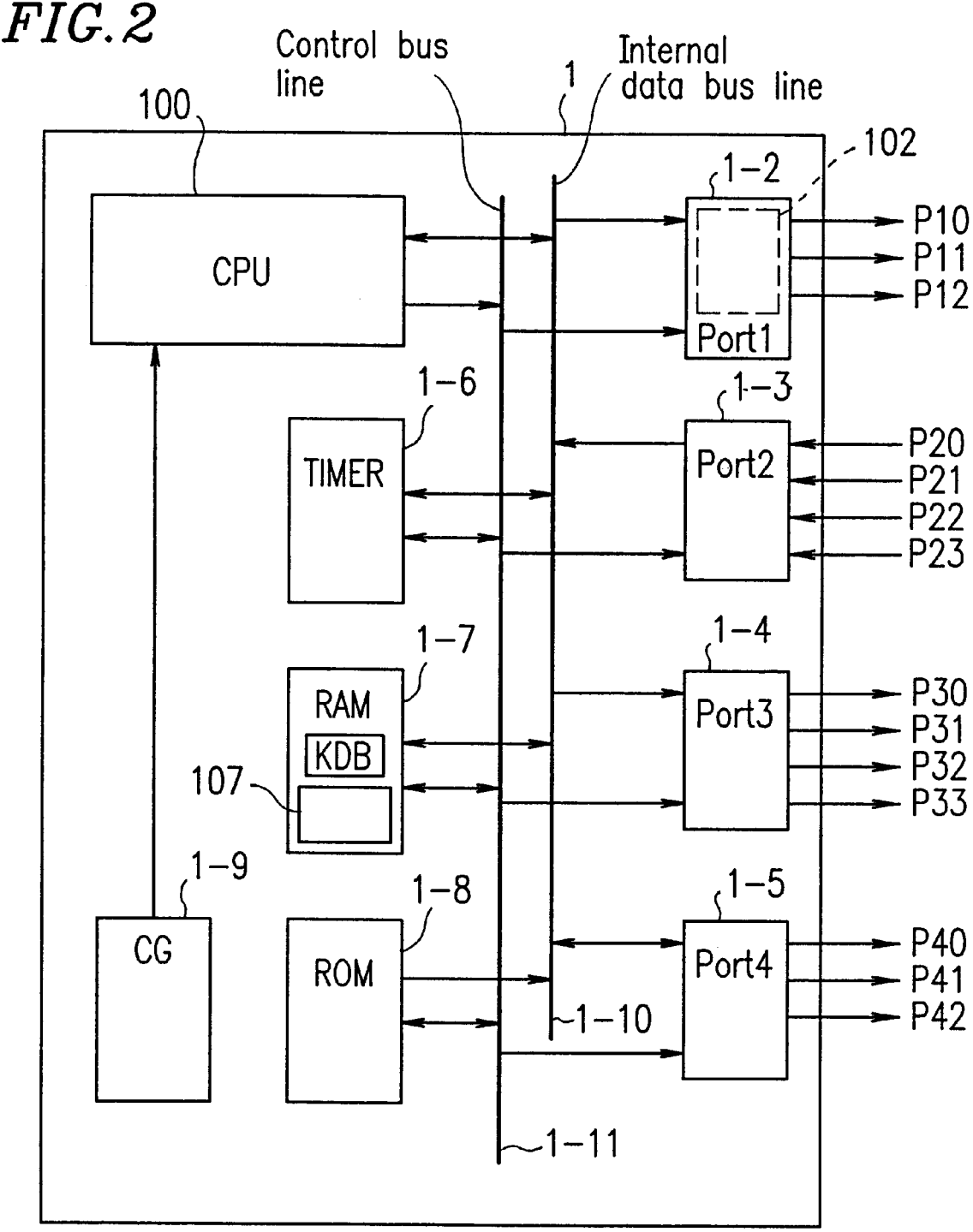
FIG. 2 is a diagram showing an example of a configuration of a microcomputer.

The CPU 200 reads a program stored in the ROM 1-8 (see FIG. 2). At Step S11, the CPU 200 initializes and starts the timer unit 1-6 (see FIG. 2) prior to the processing routine.

At Step S12, the CPU 200 reads a segment signal output from the segment driving port P43 and determines whether the signal is at a high level or at a low level. At Step S12, when a segment signal transmitted from the segment driving port P43 is at a low level, the CPU 200 determines that driving is performed in time division on a digit basis, and proceeds to Step S22.

On the other hand, at Step S12, when a segment signal output from the segment driving port P43 is at a high level, the CPU 300 determines that driving is performed in time division on a segment basis, and proceeds to Step S13.

At Step S13, in order to determine which segment is being driven, the CPU 200 initializes a software counter (COUNT_DIG) disposed in a region on the RAM 1-7 (see FIG. 2) to zero.

Then, the CPU 200 proceeds to Step S14, and stands by, waiting for the elapse of a blanking period Tb based on time info tion from the timer unit 1-6. Upon confirming the elapse of the blanking period Tb, the CPU 200 proceeds to Step S15, and turns on all of the select signals output from the output ports P10, P11, and P12 which light up the current display segment. Then, the CPU 200 turns on one of the segment signals which are being driven, based on the software counter (COUNT_DIG), and restarts the timer unit 1-6 to proceed to Step S16.

At Step S16, the CPU 200 stands by, waiting for the elapse of a period Tf during which a return signal from the keyboard switch 2 becomes readable, based on time information from the timer unit 1-6. Upon confirming the elapse of the period Tf, the CPU 200 proceeds to Step S17. The CPU 200 reads a return signal from the keyboard switch 2 through the ports P20 to P23, temporarily stores the return signal in a buffer (KDB) disposed in an area on the RAM 1-7, and restarts the timer unit 1-6 so as to measure a display driving period Td to proceed to Step 618.

At Step S18, the CPU 200 stands by, waiting for the elapse of a display driving period Td, based on time information from the timer unit 1-6. The period (Td–Tf) is measured at Step S18 for the following reason: the period Tf has already passed, so that a period of time which it takes for a display LED module to be turned off corresponds to the period (Td–Tf).

Upon confirming the elapse of the display driving period Td at Step S18, the CPU 200 proceeds to Step S19. The CPU 200 turns off all of the segment signals, restarts the timer unit 1-6 so as to measure a blanking period Tb, and increments the software counter (COUNT_DIG) for the subsequent segment processing, to proceed to Step S20.

At Step S20, the CPU 200 determines whether or not segment scanning is completed up to the segment signal output from the segment driving port P42. This determination is based on whether or not a value of the software counter (COUNT_DIG) becomes "7". Upon confirming that lighting of all of the segments has not been completed at Step S20, the CPU 200 returns to Step S15 to restart the above-mentioned processing after Step S15.

Upon confirming the completion of lighting of all of the segments, the CPU 200 proceeds to Step S21. At Step S21, the CPU 200 determines a pressed state of the keyboard switch 2, based on sampling data of a return signal from the keyboard switch 2 temporarily stored in the buffer. Thereafter, the CPU 200 returns to Step S13, and restarts the processing after Step S13.

At Step S12, when determining that driving is performed in time division on a digit basis, the CPU 200 conducts Steps S22 to S30. The contents of Steps S22 to S30 are the same as those in Steps S1 to S9 in Embodiment 1. Therefore, the description thereof will be omitted here.

The one-chip microcomputer system of Embodiment 2 has the following effects in addition to those in Embodiment 1. In the one-chip microcomputer system of Embodiment 2, the display driving circuit driving a display device Includes means for performing time-division driving on a digit basis and means for performing time-division driving on a segment basis, and means for switching therebetween. Therefore, when the number of segments is larger than the number of digits, a display can be driven with a higher duty ratio by time-dividing display on a segment basis, compared with the case where a display is driven in time division on a digit basis. Furthermore, a time-division display on a segment basis and a time-division display on a digit basis can be switched. Therefore, in the case where the number of digits is smaller than that of segments, time-division driving on a digit basis as in a conventional example can be performed, and in the case where the number of digits is larger than that of the segments, time-division driving on a segment basis can be performed.

In addition, according to the above-mentioned structure, a time-division system on a digit basis or a time-division system on a segment basis can be selected, so that an identical one-chip microcomputer can be used among different equipment. Thus, display driving suitable for a display device can be selected.

EMBODIMENT 3

A one-chip microcomputer system of Embodiment 3 of the present invention will be described with reference to FIGS. 8A, 8B, and 9 to 11. The one-chip microcomputer system of Embodiment 3 has a structure in which a display control unit (DSPC) 11-12 shown in FIG. 8B is incorporated into a microcomputer 11 shown in FIG. 8A.

First, an internal structure of the microcomputer 11 will be described with reference to FIG. 8A. The microcomputer 11 includes a CPU 300, Port 1 (11-2), Port 2 (11-3), Port 3 (11-4) and Port 4 (11-5), a timer unit 11-6, a RAM 11-7, a ROM 11-8, a clock generator (CG) 11-9, an internal data bus line 11-10, and a control bus line 11-11, This structure is the same as that of the microcomputer 1 shown in FIG. 2.

In addition to the above-mentioned structure, the microcomputer 11 includes the above-mentioned display control unit 11-12, multiplexers 11-13, 11-14, and 11-15, and a counter 11-16 for measuring a period Tf.

The multiplexer 11-13 multiplexes outputs from the display control unit 11-12 and the Port 1 (11-2). The multiplexer 11-13 is provided so as to give general versatility to the one-chip microcomputer 11.

The multiplexers 11-14 multiplex write signals of output latches of the Port 3 (11-4) and signals P30a to P33a shown in FIG. 8B, and the multiplexers 11-15 multiplex write signals of output latches of the Port 4 (11-5) and signals P40a to P42a shown in FIG. 8B.

Figure 8A:
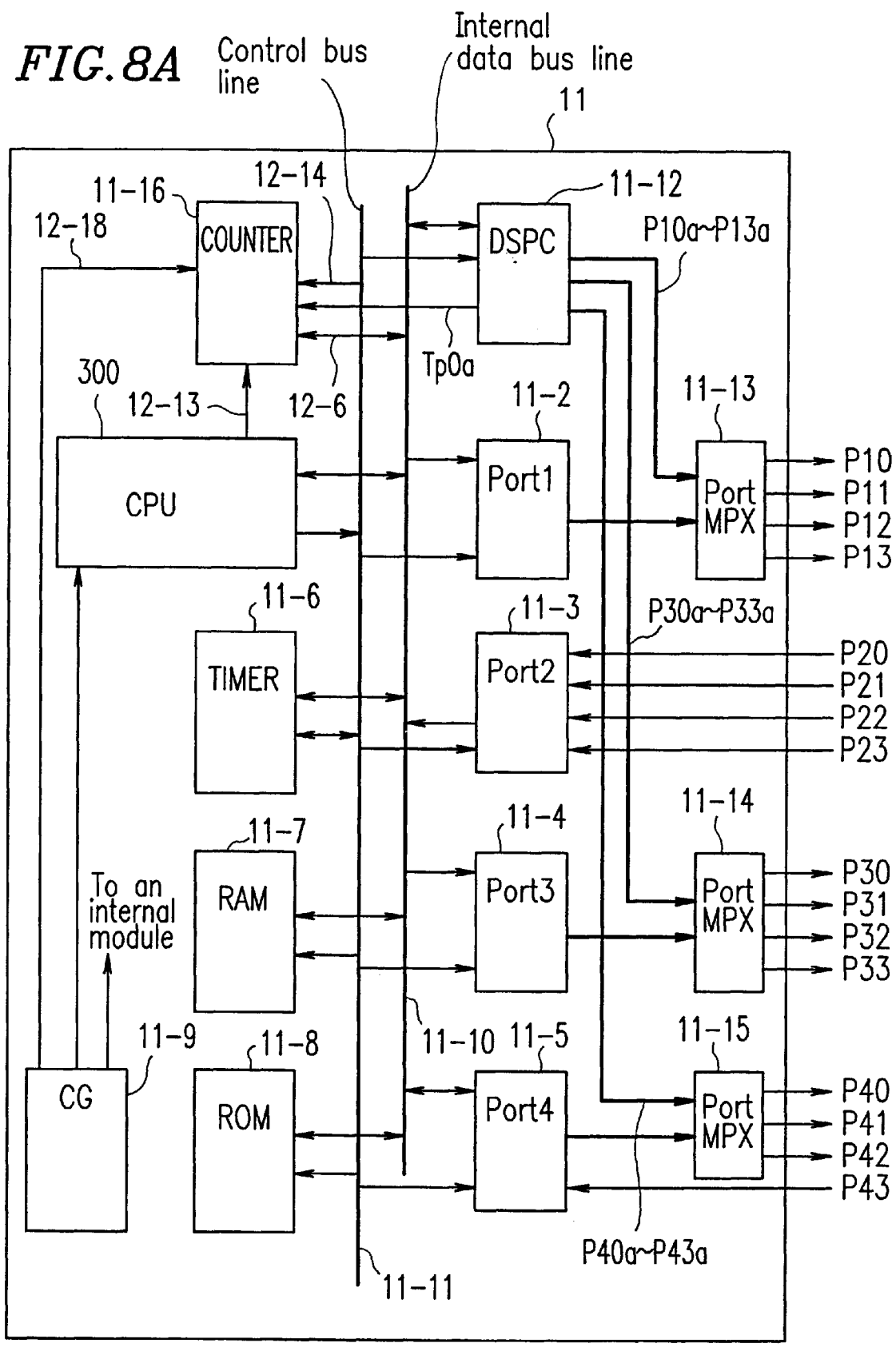
FIG. 8A is a diagram showing an example of a configuration of a microcomputer of Embodiment 3.
Figure 8B:
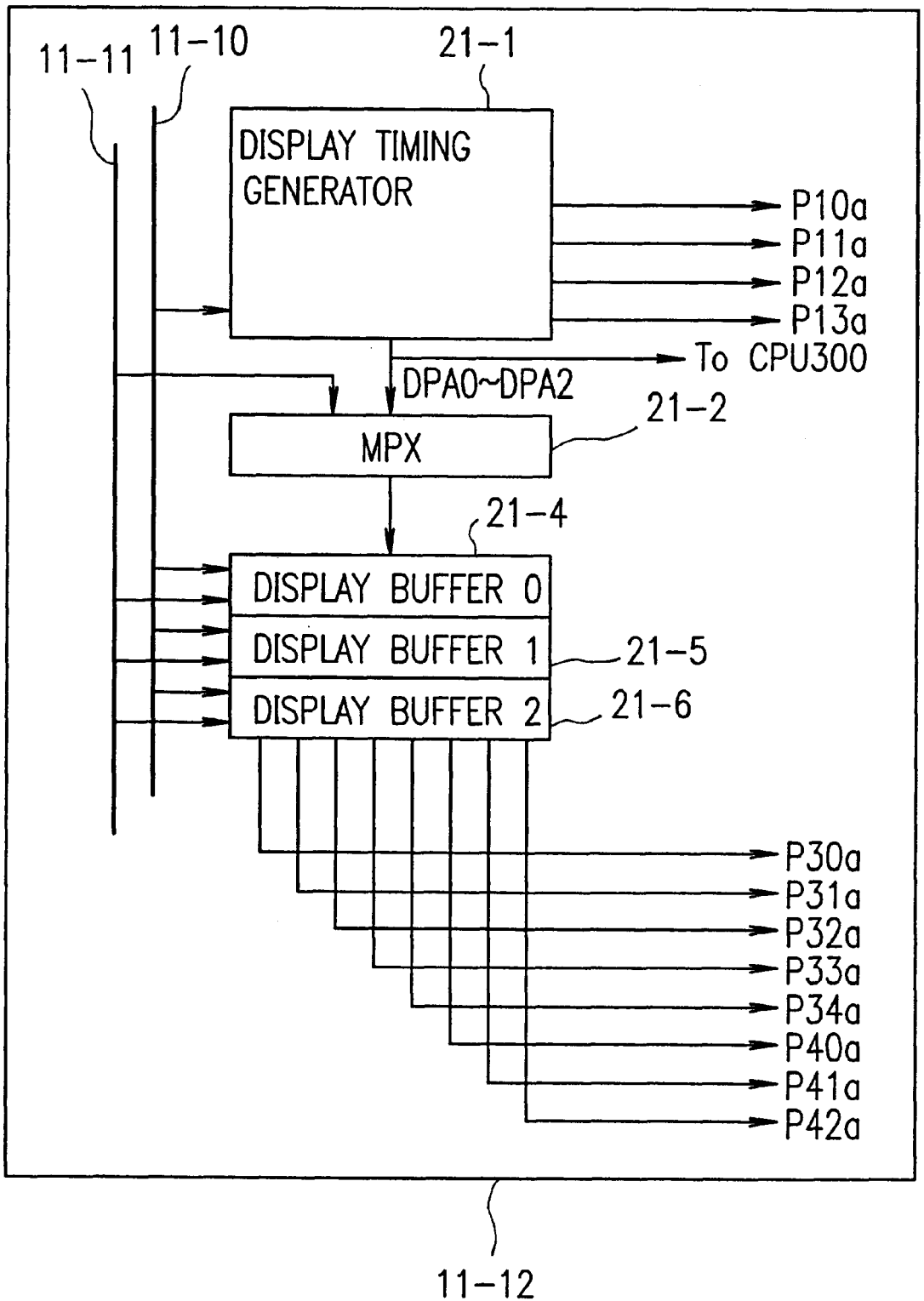
FIG. 8B is a diagram showing an example of a display control unit.

In the multiplexers 11-13, 11-14, and 11-15 shown in FIG. 8A, a switching circuit is omitted. An example of a simple structure is that a multiplexer is composed of an OR gate (logical OR circuit), and outputs of the Port 1 (11-2), Port 2 (11-3), and Port 3 (11-4) are set to be 0, whereby a switching circuit is omitted.

Figure 9:
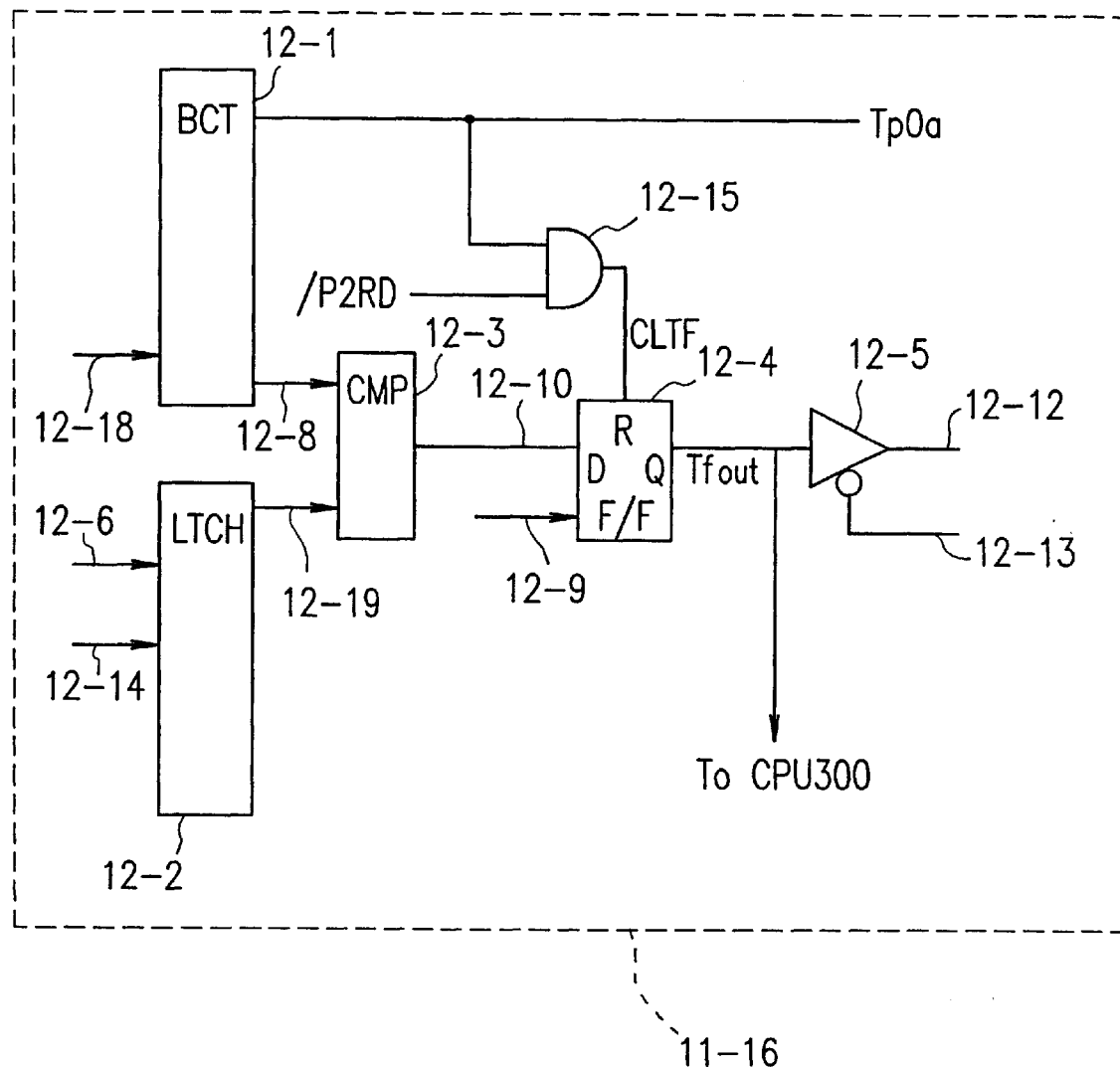
FIG. 9 is a diagram showing an example of a counter.

The counter 11-16 measures a period Tf in synchronization with an output signal from the display control unit 11-12, and is composed of a circuit shown in FIG. 9.

As shown in FIG. 9, the counter 11-6 includes a binary counter (BCT) 12-1 with a reset function, a latch (LTCH) 12-2, a digital comparator (CMP) 12-3, a flip-flop (F/F) 12-4, an AND gate 12-15, and a 3-state buffer 12-5. Hereinafter, an operation of the counter 11-16 will be described.

The binary counter 12-1 counts clocks output from the clock generator 11-9 through a line 12-18. A signal Tp0a is input tb a reset input of the binary counter 12-1 from the display control unit 11-12. Herein, the signal Tp0a refers to a signal forming a base of each digit signal output from the binary counter 12-1.

The latch 12-2 holds counts. The CPU 300 is capable of writing an arbitrary value in the latch 12-2, using a line 12-6 connected to the internal data bus line 11-10 and a line 12-14 connected to the control bus line 11-11. The digital comparator 12-3 receives an output signal 12-8 from the binary counter 12-1 and an output signal 12-19 from the latch 12-2, and determines whether the output signal 12-8 is matched with an output signal 12-10. The output signal 12-10 of the digital comparator 12-3 is given to a D-terminal of the flip-flop 12-4, and the flip-flop 12-4 is driven with a signal of opposite phase of clocks for the purpose of removing a glitch appearing in the output signal 12-10.

A reset terminal R of the flip-flop 12-4 is connected to an output terminal of the AND gate 12-15. A signal CLTF which is an AND of the signal Tp0a and a lead signal /P2RD from the Port 2 (11-3) is input to the reset terminal R of the flip-flop 12-4.

Due to the above-mentioned structure, the output signal Tfout from the flip-flop 12-14 is reset at a low level pulse of the signal Tp0a (the output signal Tfout becomes 0). After the elapse of a period of counted clocks equal to the value of the latch 12-2, 1 is set as the output signal Tfout, and a signal which is again reset by the lead signal /P2RD from the Port 2 (11-3) is output.

The 3-state buffer 12-5 reads an output signal Tfout from the flip-flop 12-4 at an arbitrary timing of the CPU 300. The 3-state buffer 12-5 is driven with a read signal 12-13 from the CPU 300, and a driving output 12-12 is output to one-bit line of the line 12-6 connected to the internal data bus line 11-10 of the CPU 300. In FIG. 8A, one-bit lines are shown for simplicity. However, each line may include a plurality of leads for sending a multi-bit signal.

An operation of the microcomputer 11 in the case where the measured period Tf Is set in the latch 12-2 will be described with reference to FIG. 10.

Figure 10:
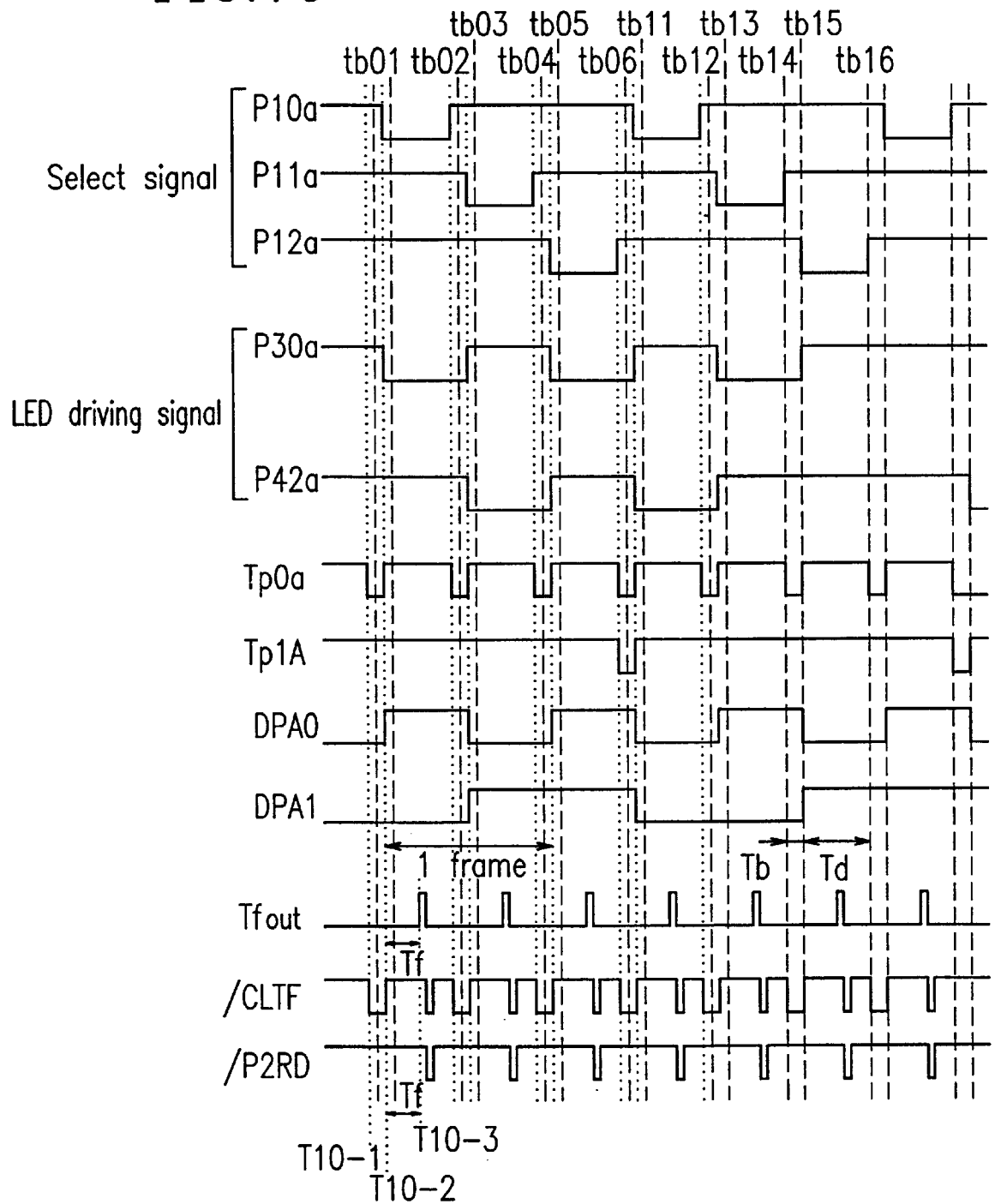
FIG. 10 is a diagram showing an example of an operation timing of a one-chip microcomputer system of Embodiment 3.

FIG. 10 shows an operation timing of the counter 11-16. In FIG. 10, select signals P10a to P12a, LED driving signals P30a to P42a, a signal Tp0a, a signal Tp1A, and signals such as display buffer pointers DPA0 and DPA1 which are pointer information are the same as those shown in FIG. 22. Herein, the display buffer pointers DPA0 and DPA1 refer to address signals ouput from the display timing generator 21-1 to the multiplexer 21-2 in FIG. 21. Herein, the signal Tp1a refers to a signal for initializing a counter after counting the signal Tp0a for the required number of digits, the signal Tp1a being output in synchronization with an output timing of the signal Tp0a after the display buffer pointers DPA0 and DPA1 both become 1.

In FIG. 10, a signal Tfout is reset at T10-1 at which the signal Tp0a becomes a low level. Then, at T10-2 at which the signal Tp0a becomes a high level, the binary counter 12-1 in FIG. 9 starts counting clocks. After the elapse of a period Tf from T10-2 (i.e., at T10-3), the signal Tfout is reset again. Thereafter, this operation is repeated.

Next, control processing of the CPU 300 in the case where key scanning and display driving are performed by using the microcomputer 11 shown in FIG. 8A will be described with reference to FIG. 11. It is assumed that a value output from a timer and a reference value Tf to be compared are previously stored in the latch 12-2.

Figure 11:
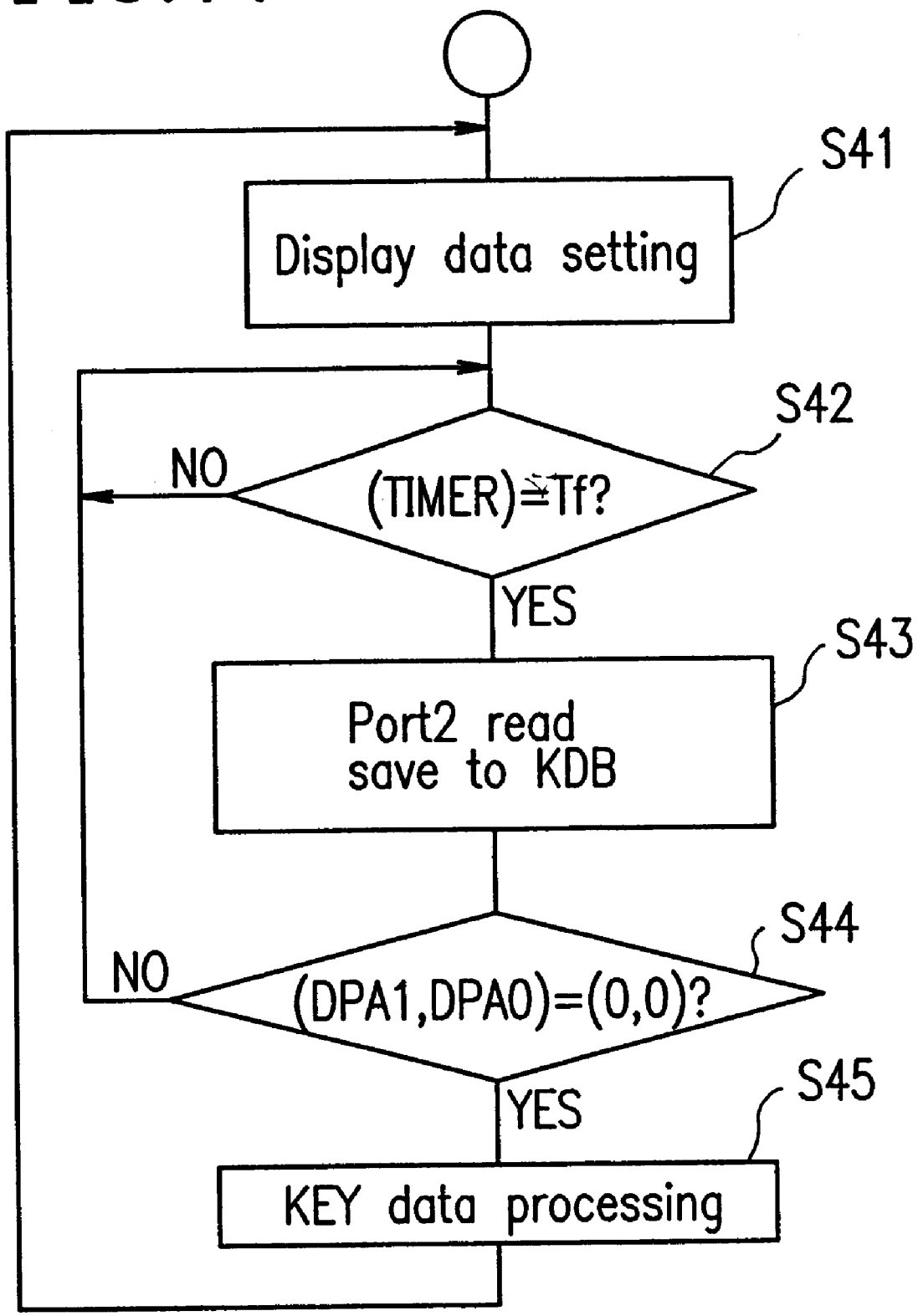
FIG. 11 is a flow chart showing an operation procedure of the one-chip microcomputer system of Embodiment 3.

The CPU 300 reads a program for performing the processing shown in FIG. 11 from the ROM 11-8.

At Step S41, the CPU 300 writes display data sent from the internal data bus line 11-10 in display buffers (DISPLAY BUFFER 21-4 to 21-6), updates display contents, and proceeds to Step S42.

At Step S42, the CPU 300 determines whether or not the signal Tfout shown in FIG. 10 becomes 1, i.e., whether or not the measured period of the counter 11-16 becomes the reference value Tf. For example, by checking whether or not the signal Tfout is 1, the CPU 300 will indirectly know whether or not a period of the counter 11-16 is the reference value Tf. In this case, when the CPU 300 confirms that the signal Tfout becomes 1, the CPU 300 proceeds to Step S43.

At Step S43, the CPU 300 reads a return signal from the keyboard switch 2 through the Port 2 (11-3), stores the read date in a key data buffer (KDB) formed on the RAM 11-7, and proceeds to Step S44.

At Step S44, the CPU 300 reads the display buffer pointers DPA0 and DPA1 of the display control unit 11-12 shown in FIG. 8B, and determines whether or not a scanning frame of the keyboard switch 2 is completed. At Step S44, in the case where neither of the display buffer pointers DPA0 and DPA1 is 0, the CPU 300 determines that the scanning frame of the keyboard switch 2 is not completed, and returns to Step S42. At Step S44, in the case where both the display buffer pointers DPA0 and DPA1 are 0, the CPU 300 proceeds to Step S45.

At Step S45, the CPU 300 analyzes return signal data from the keyboard switch 2 at each scanning timing stored in the key data buffer on the RAM 11-7 and determines an input state of a key.

Figure 4:
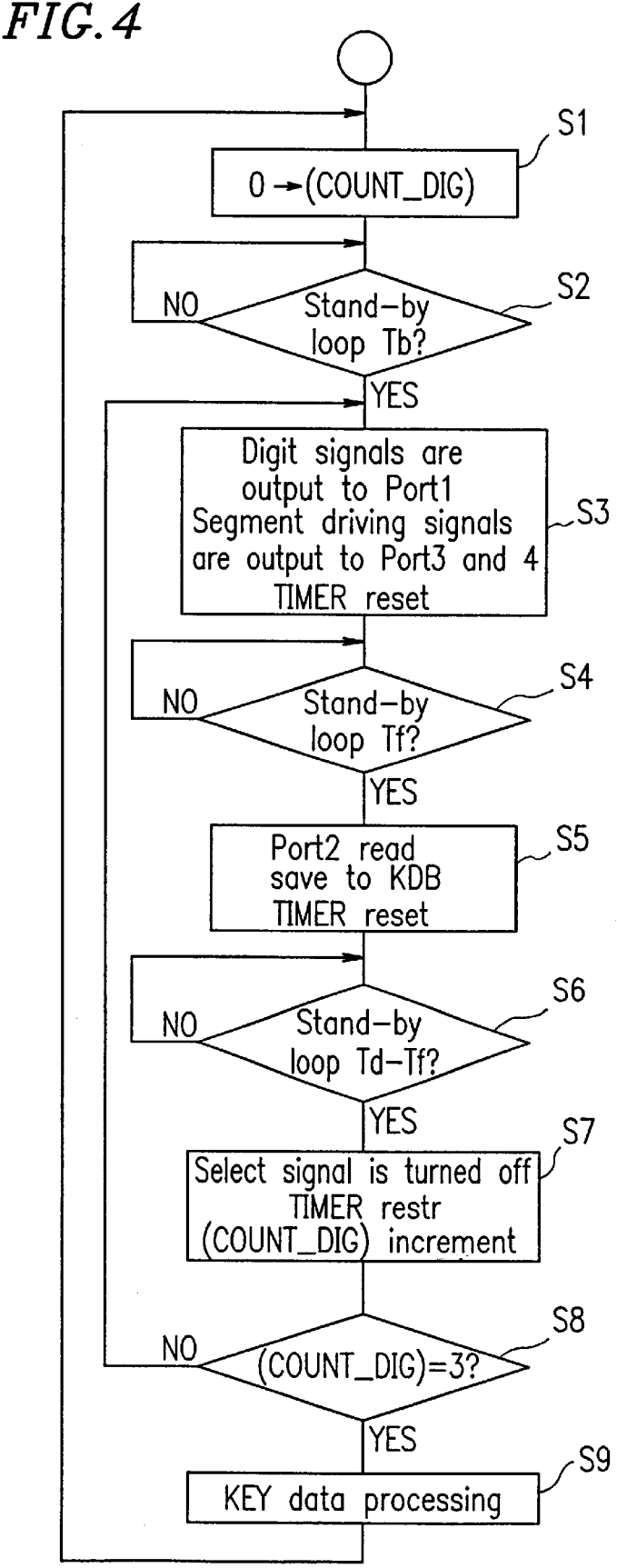
FIG. 4 is a flow chart showing an operation procedure of the one-chip microcomputer system of Embodiment 1.

Thereafter, the CPU 300 proceeds to Step S1 shown in FIG. 4. At Step S1 in FIG. 4, the CPU 300 initializes a software counter (COUNT_DIG) disposed in a region on the RAM 11-7 to 0.

The one-chip microcomputer system of Embodiment 3 includes a counter for measuring a predetermined period of time which can be arbitrarily programmed from an ON timing of a display scanning signal supplied from the display driving circuit, and an output from the counter is detected by a CPU. According to this structure, the above-mentioned period Tf can be automatically measured by hardware (i.e., CPU) in synchronization with a change in a scanning signal of a hey. Therefore, the structure of software can be simplified, and productivity thereof can be enhanced.

EMBODIMENT 4

A one-chip microcomputer system of Embodiment 4 of the present invention will be described with reference to FIGS. 12 to 15.

Figure 12:
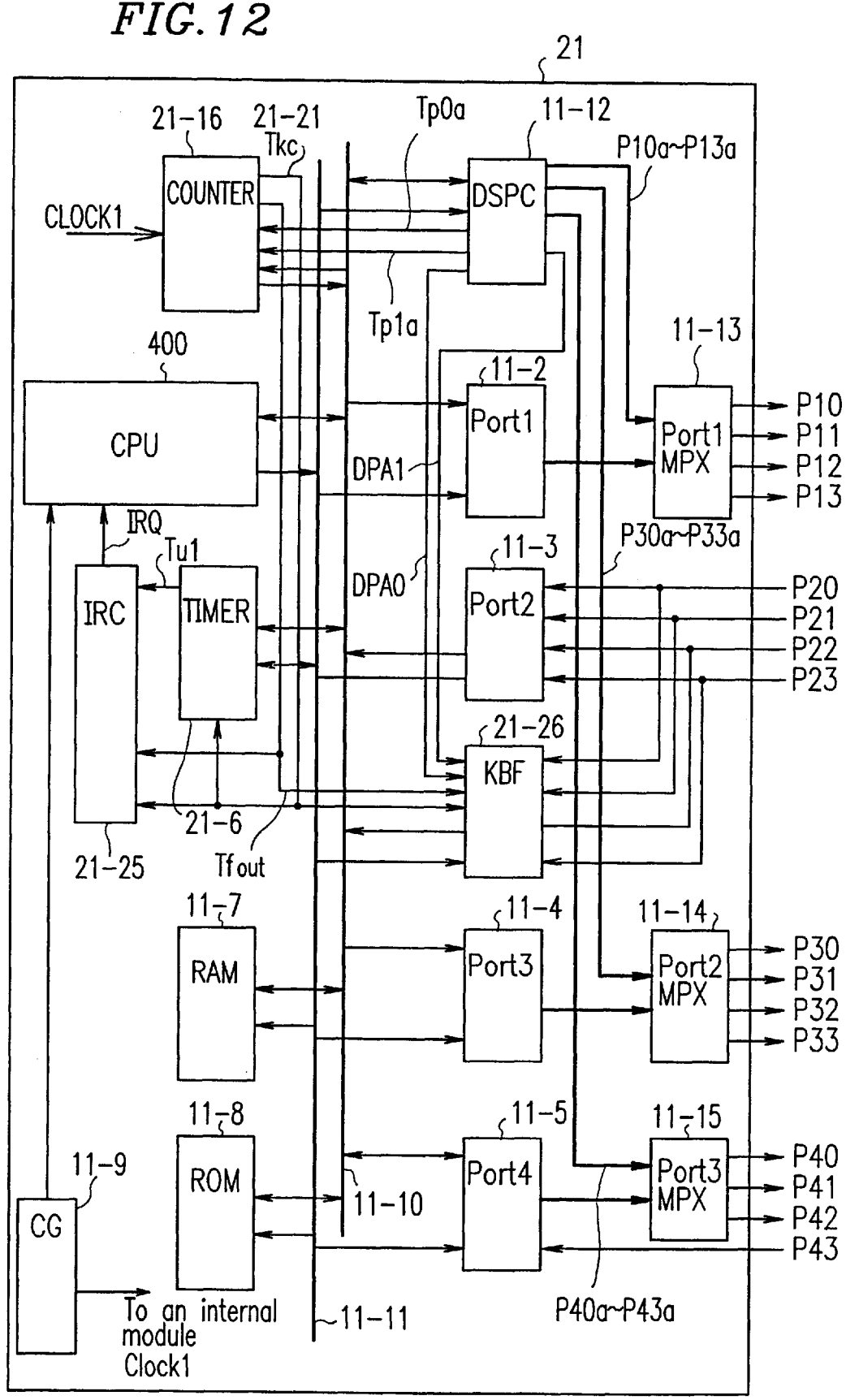
FIG. 12 is a diagram showing an example of a configuration of a microcomputer of Embodiment 4.

FIG. 12 is a view showing a structure of a microcomputer 21. For simplicity, the microcomputer 21 shown in FIG. 12 includes three scanning lines of a keyboard switch 2. However, it is appreciated that the number of scanning lines is not limited to three.

The microcomputer 21 has the same structure as that of the microcomputer 11 shown in FIG. 8A, except that a key data buffer circuit (KBF) 21-26 and an interrupt controller (IRC) 21-25 are added, and a modified counter 21-16 for measuring a period Tf is provided. In FIG. 12, the same components as those in FIG. 8A are denoted by the same reference numerals as those therein. The description thereof will be omitted.

The counter 21-16 outputs a signal Tkc indicating the completion of scanning of the keyboard switch 2 to a timer unit 21-6. Furthermore, the signal Tkc from the counter 21-16 is given to the key data buffer circuit 21-26 and the interrupt control circuit 21-25.

The key data buffer circuit 21-26 writes a return signal input from the keyboard switch 2 through terminals P20 to P23 of a Port 2 (11-3) in a register specified by display buffer pointer signals PDA0 and PDA1 output from a display control unit 11-12 in synchronization with a falling leg of the signal Tfout. The details thereof will be described with reference FIGS. 13 and 14.

The interrupt controller 21-25 adjusts an interrupt request signal generated inside or outside of the microcomputer 21 in order of preference, and enables, disables, or masks (temporarily store an input signal) an interrupt to a CPU 400 through an internal data bus line 11-10 and/or a control bus line 11-11.

The interrupt controller 21-25 receives the signals Tfout and Tkc as interrupt request signals. Examples of interrupt signals to be input to the interrupt controller 21-25 include a predetermined period measuring completion request signal Tul from the timer unit 21-6. The other interrupt request signals are not directly related to the present invention, so that the description thereof will be omitted.

An output signal IRQ from the interrupt controller 21-25 turns high when an interrupt request is present, and gives the CPU 400 an interrupt request. When the CPU 400 accepts an interrupt by the interrupt signal Tfout through the internal data bus line 11-10 and the control bus line 11-11, an interrupt occurs with respect to the CPU 400 per scanning of the keyboard switch 2. When the CPU 400-accepts an interrupt by the interrupt signal Tkc through the internal data bus line 11-10 and. the control bus line 11-11, an interrupt occurs with respect to the CPU 300 every time one frame of scanning of the keyboard switch 2 is completed.

Figure 13:
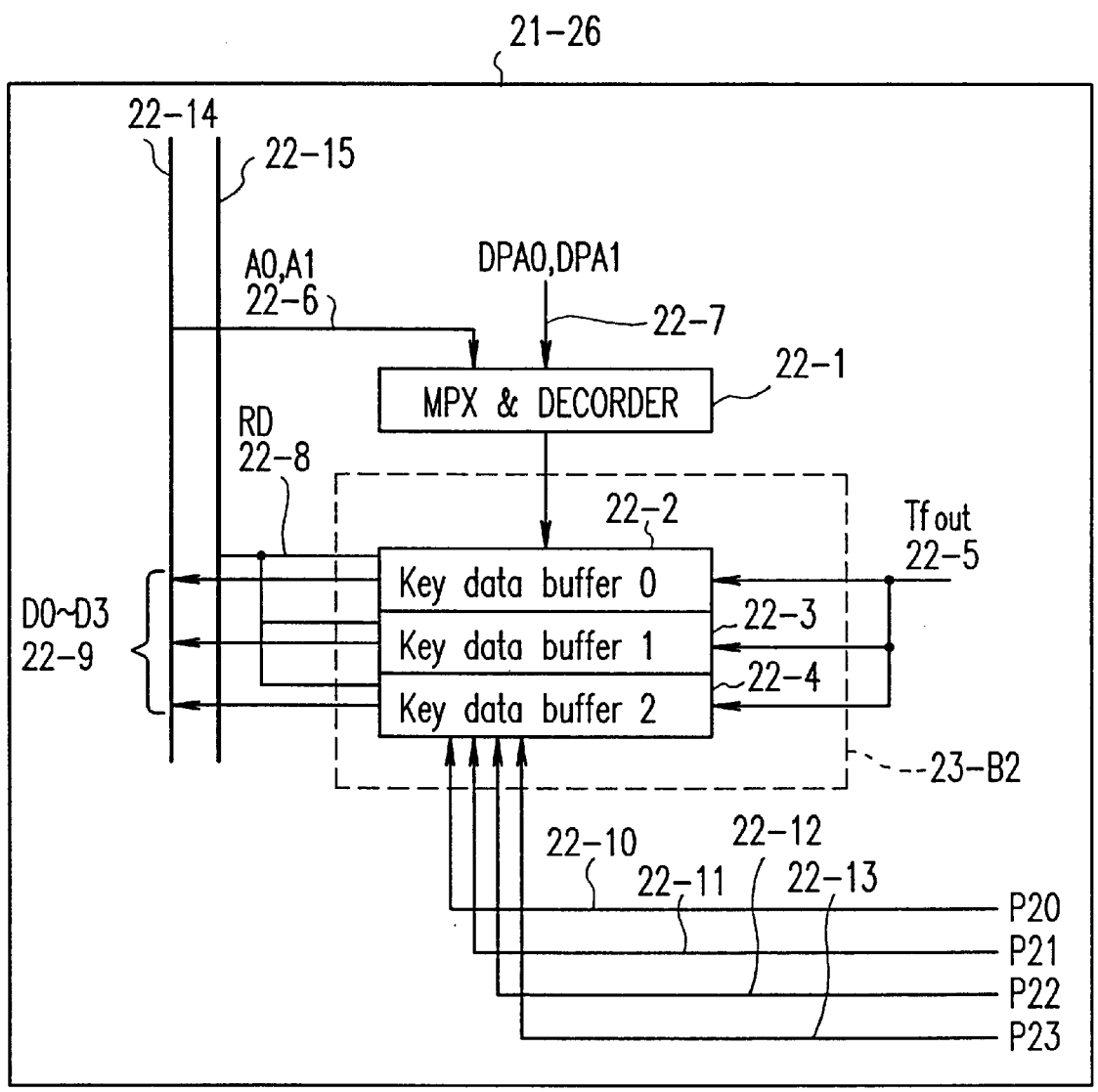
FIG. 13 is a diagram showing an example of a key data buffer circuit.

FIG. 13 is a view showing a circuit configuration of the key data buffer circuit 21-26. The key data buffer circuit 21-26 includes an address input circuit 22-1, and a buffer 23-52 having key data buffers 22-2 to 22-4.

The address input circuit 22-1 includes a multiplexer and a decoder. The multiplexer multiplexes the display buffer pointer signals DPA0 and DPA1 supplied from the display control unit 11-12 and address signals A0 and A1 supplied from the CPU 400, and the decoder decodes multiplexed address information.

The key data buffers 22-2 to 22-4 temporarily hold a return signal from the keyboard switch 2 for one scanning frame.

In FIG. 13, in the case where the CPU 400 does not access the key data buffers 22-2 to 22-4, either of the 0th key data buffer 22-2 to the second key data buffer 22-4 is selected by 2 bits of the display buffer pointer signals DPA0 and DPA1. When the signal Tfout denoted by reference numeral 22-5 is input to the buffer 23-B2, a signal input through the terminals P20 (22-10) to P23 (22-13) of the Port 2 (11-3) are latched.

Figure 14:
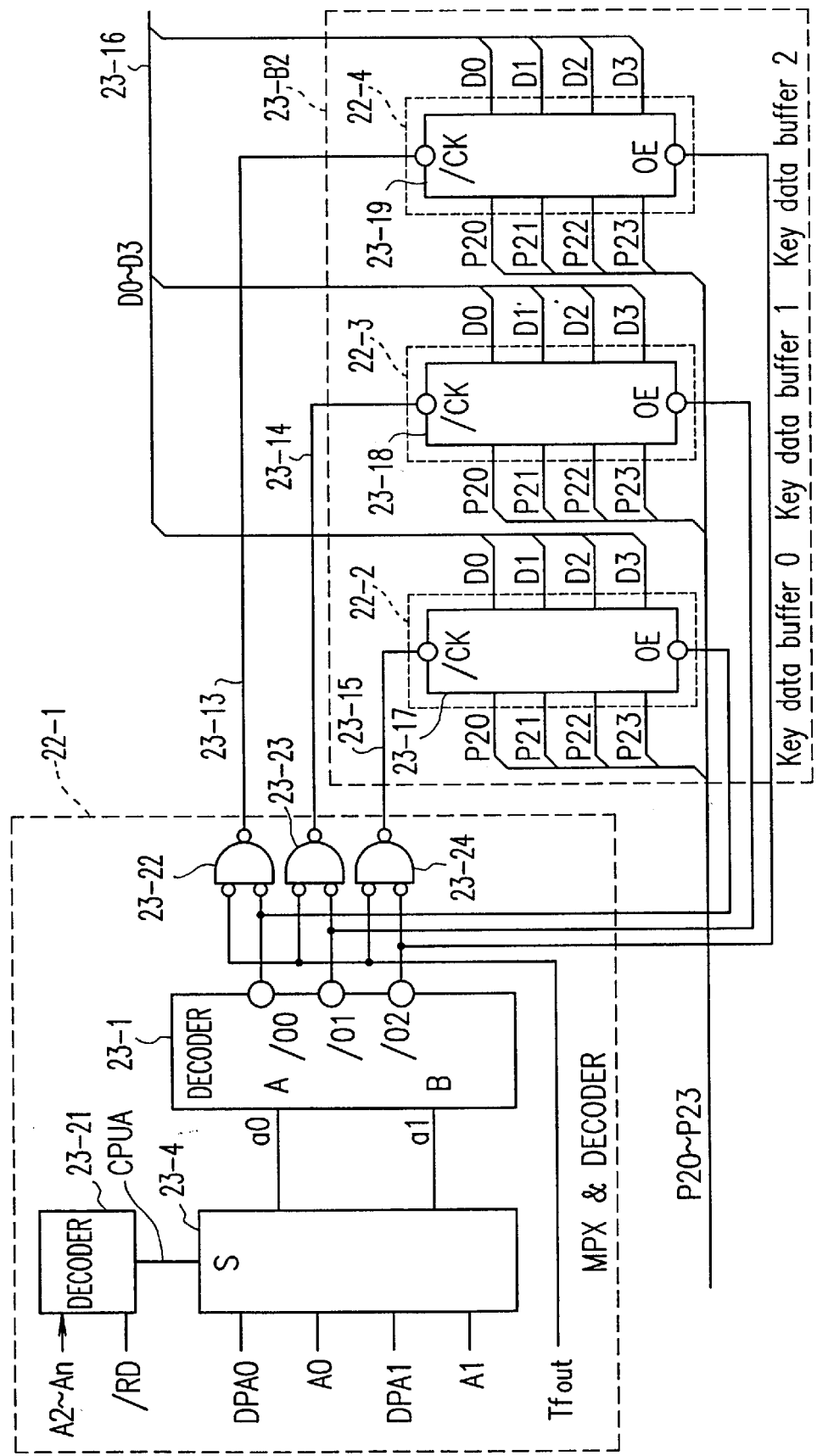
FIG. 14 is a diagram showing details of the key data buffer circuit shown in FIG. 13.

FIG. 14 is a view showing the address input circuit 22-1 and the buffer 23-B2 in more detail. The address input circuit 22-1 includes a decoder 23-1, a decoder 23-21, a data selector 23-4, and OR gates 23-22 to 23-24. The key data buffers 22-2 to 22-4 include registers 23-17 to 23-19, respectively.

The decoder 23-21 decodes (n−1) bits of address signals A2 to An from the CPU 400 to generate a signal CPUA which turns high while the CPU 400 accesses the key data buffer circuit 21-26.

A data selector 23-4 receives address signals A0 and A1 and the display buffer pointer signals DPA0 and DPA1, and outputs address signals a0 and a1 which address the 0th key data buffer to the second key data buffer. The data selector 23-4 outputs the address signals a0 and a1 corresponding to the address signals A0 and A1 to the decoder 23-1 while the signal CPUA is high. The data selector 23-4 outputs the address signals a0 and a1 corresponding to the display buffer pointer signals DPA0 and DPA1 to the decoder 23-1 while the signal CPUA is low.

The decoder 23-1 decodes the address signals a0 and a1, and generates key data buffer selection signals /00 to /02.

The OR gates (logical OR gates) 23-22 to 23-24 generate a write edge at a low level while one of the key data buffer selection signals /00 to /02 and the signal Tfout are both low.

Registers 23-17 to 23-19 include 4-bit D-type fllp-flops corresponding to the 0th key data buffer to the second key data buffer, and output buffers which control the outputs of the flip-flops in 3 states. A signal for selecting a flip-flop is received by a 3-state buffer having the flip-flop to be selected, the 3-state buffer becomes electrically connected, and a signal is output from the flip-flop. On the other hand, when a signal for not selecting a flip-flop is received by a 3-state buffer having the flip-flop which is not to be selected, the >-state buffer has a high impedance, and a signal is not output from the flip-flop. More specifically, the 3-state buffer performs exclusive control.

It is assumed that the CPU 400 inactivates the address signals A2 to An, and does not access the key data buffer circuit 21-26. Registers 23-17 to 23-19 of the key data buffer circuit 21-26 are addressed with the display buffer pointer signals DPA0 and DPA1, and input data is successively written in the terminals P20 to P23 of the Port 2 (11-3) in synchronization with the signal Tfout.

Hereinafter, control of the CPU 400 in the case where scanning of the keyboard switch 2 and driving a display by using the microcomputer 21 will be described with reference to FIG. 15.

Figure 15:
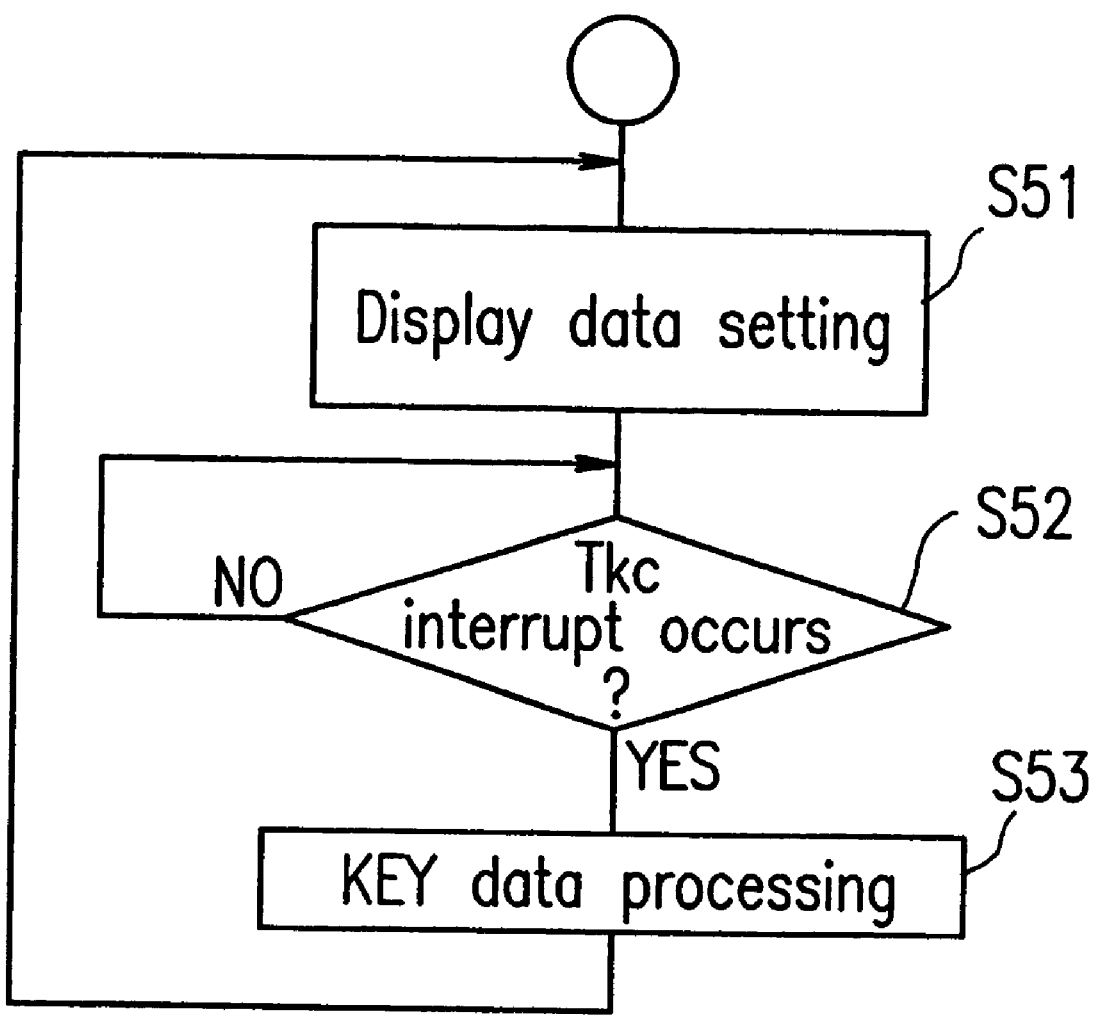
FIG. 15 is a flow chart showing an operation procedure of the one-chip microcomputer system of Embodiment 4.

FIG. 15 is a flow chart showing the abovementioned operation of the microcomputer 21, in which an interrupt occurs and the keyboard switch 2 is scanned per scanning frame.

The CPU 400 reads a program for scanning the keyboard switch 2 and driving a display from the ROM 11-8.

At Step S51, the CPU 400 sets display data in the display control unit 11-12.

At Step S52, the CPU 400 waits for receiving an interrupt signal Tkc, and upon confirming that an interrupt occurs, the CPU 400 proceeds to Step S53. In the case where the CPU 400 does not confirm that an interrupt occurs, the CPU 400 repeats Step S52.

At Step S53, the CPU 400 processes data stored in the key data buffer circuit 21-26.

The one-chip microcomputer system of Embodiment 4 includes: a memory for storing a key return signal output from the keyboard switch, not through the CPU; an interrupt signal generator for generating an interrupt signal for informing the CPU of the key return signal being stored in the memory; and an interrupt generator for generating an interrupt when a key scanning of the keyboard switch is completed over one frame. According to this structure, a return signal from the keyboard switch during one frame of scanning of the keyboard switch can be read by the CPU, so that a CPU load and a development burden of software can be reduced.

In addition, according to the above-mentioned structure, an interrupt is generated by the CPU per scanning of the keyboard switch, whereby special keyboard scanning processing becomes possible. Furthermore, if interrupt processing per scanning of the keyboard switch is made divertible to an interval timer, an application range of hardware of the microcomputer is not required to be dedicated to scanning of the keyboard switch. Therefore, flexibility (i.e., degrees of design freedom) of the one-chip microcomputer system can be enhanced. As a result, a mask ROM required for scanning the keyboard switch can be omitted, and an inexpensive control device of a display key which enables high-speed processing can be realized.

EMBODIMENT 5

Figure 16:
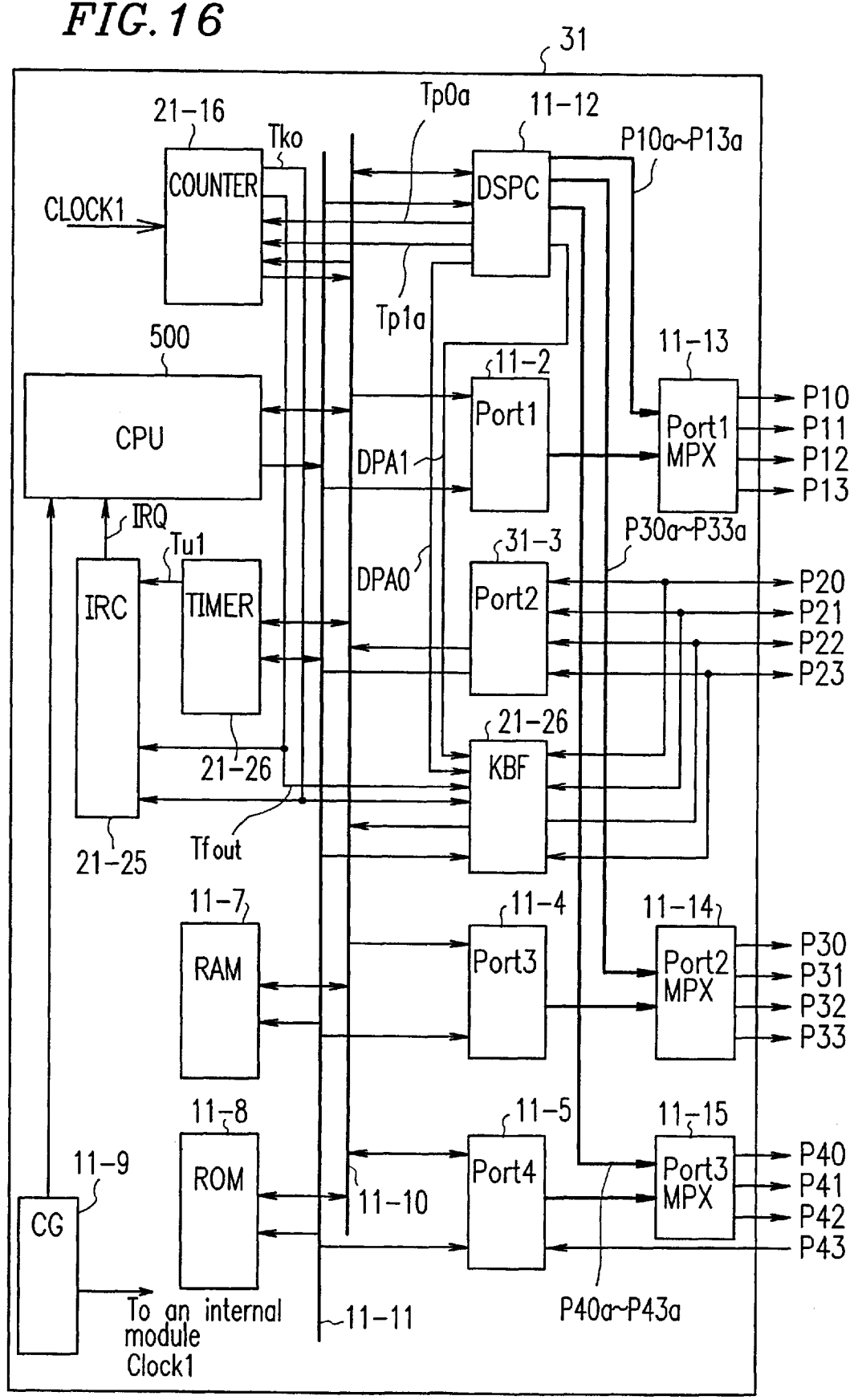
FIG. 16 is a diagram showing an example of a configuration of a microcomputer of Embodiment 5.

A one-chip microcomputer system of Embodiment 5 of the present invention will be described with reference to FIGS. 16 to 18. FIG. 16 shows a microcomputer 31 used in Embodiment 5. The microcomputer 31 has the same structure as that of the microcomputer 21 shown in FIG. 12, except for a structure of the Port 2 (see FIGS. 16 and 17). More specifically, in a microcomputer 21 in FIG. 12, the Port 2 (11-3) is an input port, whereas a Port 2 (31-3) in Embodiment 5 is an input/output part. In the one-chip microcomputer system in FIG. 16, the same components as those of the microcomputer 21 in FIG. 12 are denoted by the same reference numerals as those therein.

Figure 17:
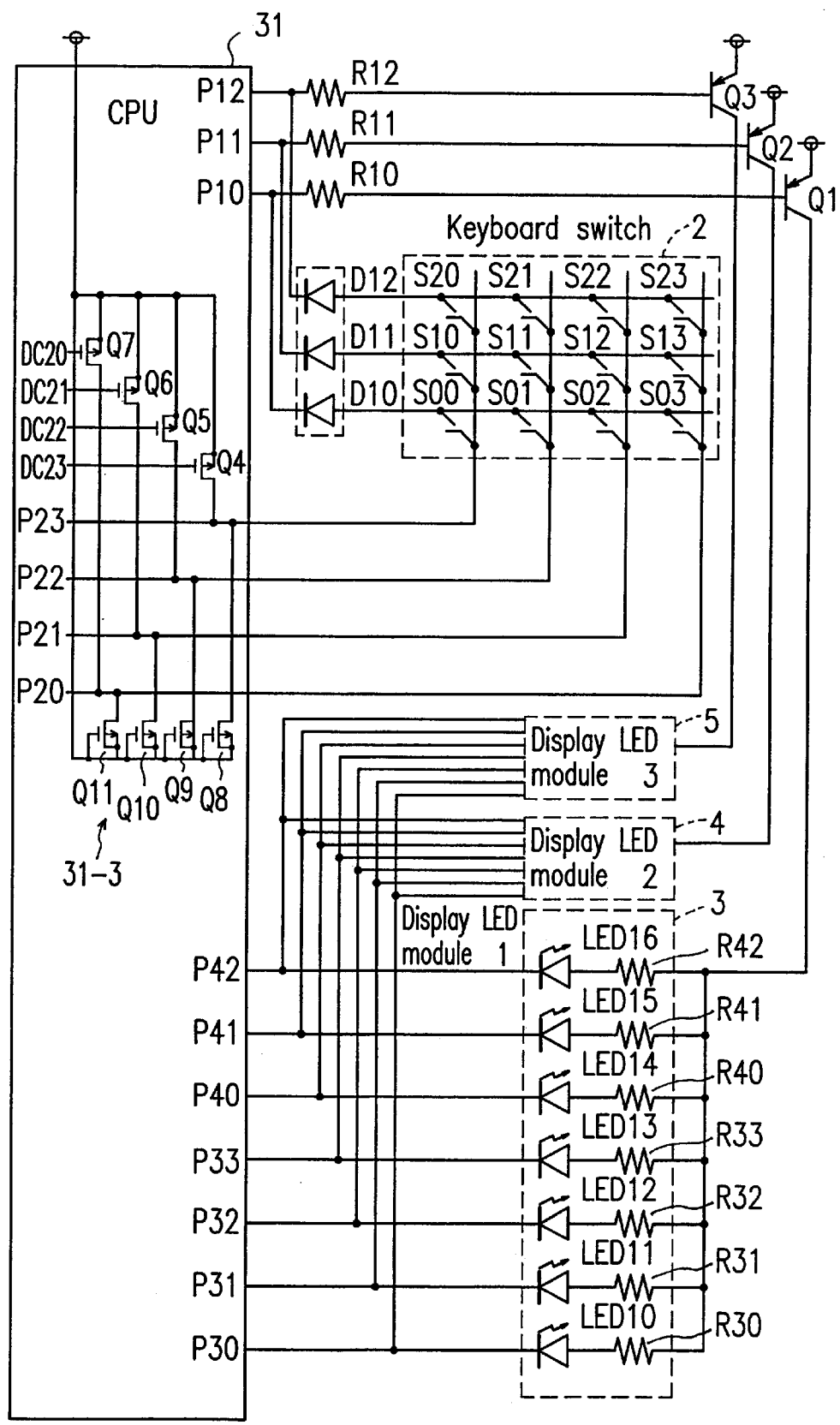
FIG. 17 is a diagram showing an example of a configuration of a one-chip microcomputer system of Embodiment 5.

FIG. 17 shows an input/output Port 2 (31-3), a keyboard switch 2, and display modules 3, 4, and 5 of the microcomputer 31.

The one-chip microcomputer system of Embodiment 5 is characterized in a structure of an output stage of the input/output Port 2 (31-3). As shown in FIG. 17, the one-chip microcomputer system of the present embodiment has a structure in which the pull-up resistors R20 to R23 shown in FIG. 1B are removed from an output stage of the input/output Port 2 (1-3) of the one-chip microcomputer system in FIG. 1B.

Referring to FIG. 17, in the input/output Port 2 (31-3) of the CPU 500, P-channel MOS transistors Q4 to Q7 with relatively small ON resistance and load MOS transistors Q8 to Q11 which work as pull-up resistors are added to each of input/output ports P20 to P23. The P-channel MOS transistors Q4 to Q7 rapidly turns signals of their output terminals high so as to scan the keyboard switch 2 at a high speed. Here, signals DC20 to DC23 input to gates of P-channel transistors Q8 to Q11 control the input/output ports P20 to P23. The input/output ports P20 to P23 become a high level or a low level with each of the signals DC20 to DC23.

Figure 18:
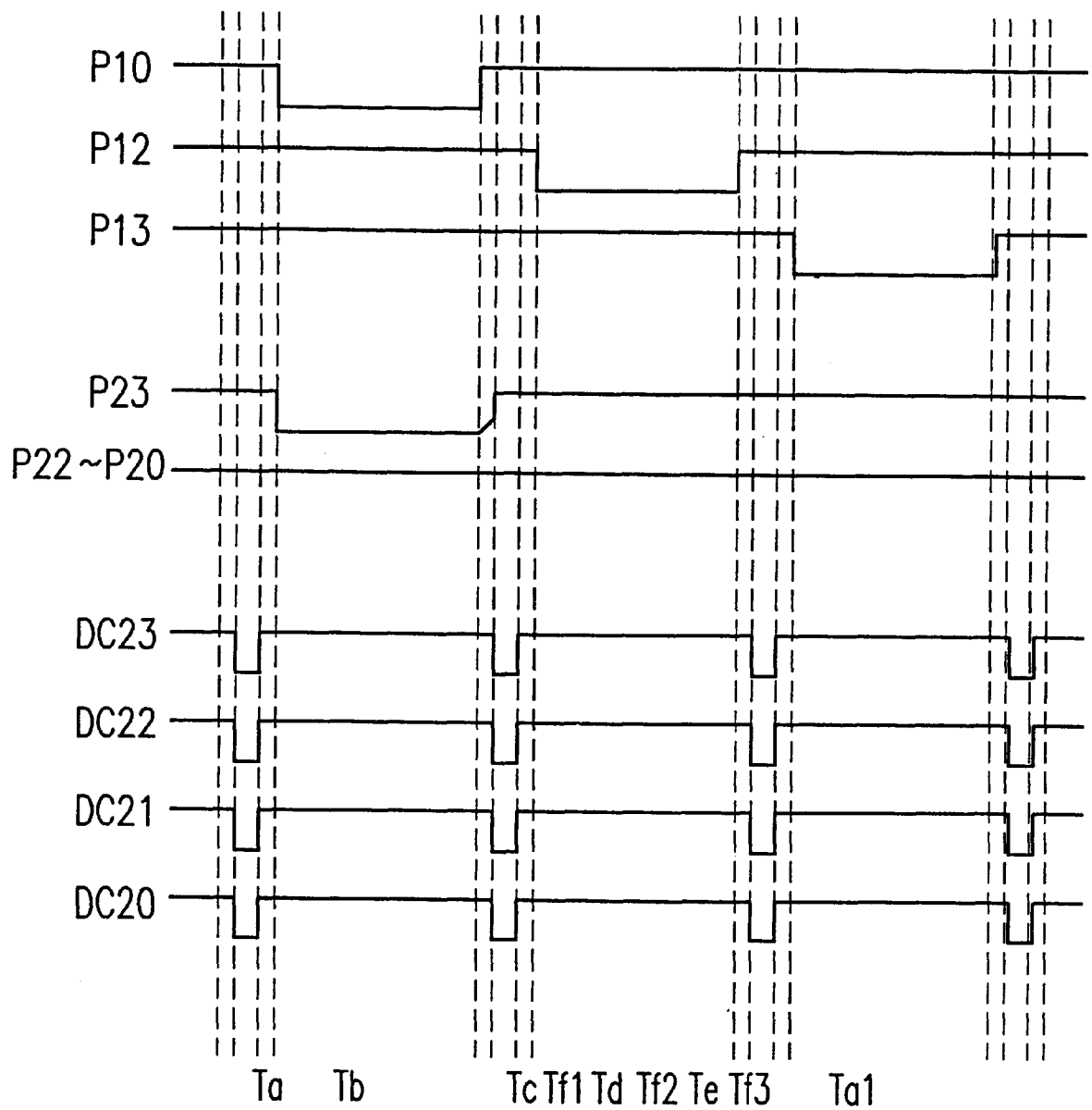
FIG. 18 is a flow chart showing an operation timing of the one-chip microcomputer system of Embodiment 5.
Figure 19:
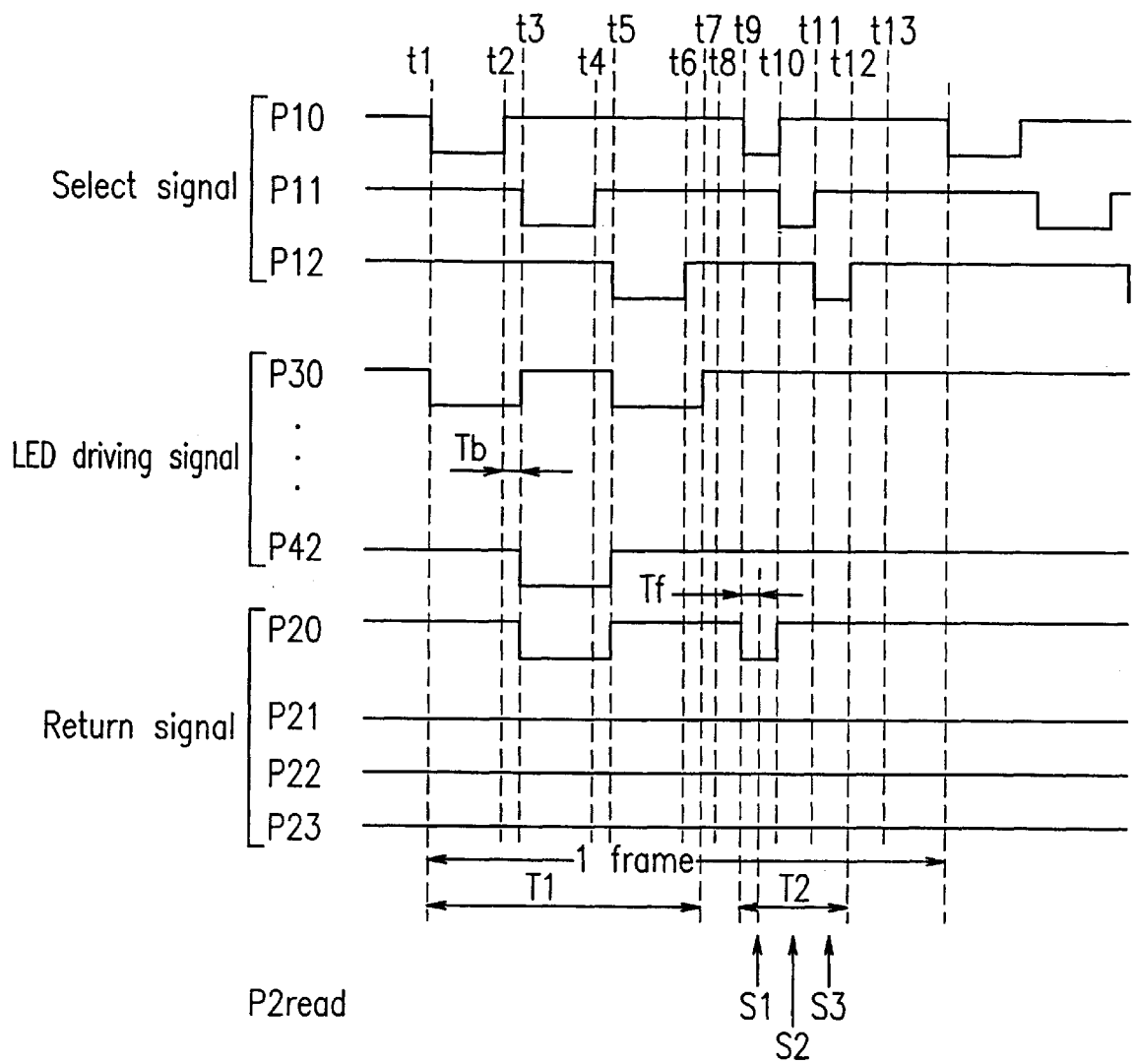
FIG. 19 is a diagram showing an operation timing of a one-chip microcomputer system shown in FIG. 23.

FIG. 18 shows an operation timing of the one-chip microcomputer system of Embodiment 5.

When the P-channel MOS transistors Q4 to Q7 attached to an output buffer of the input/output Port 2 (31-3) are turned on during a blanking period from a time when one scanning signal is turned off to a time when the next scanning line is turned on, a return signal from the keyboard switch 2 rapidly becomes high. Therefore, it is possible that the blanking period and a period Tf are shortened.

However, when a return signal from the keyboard switch 2 is driven by the Port 2 (31-3) so as to be forcefully turned high while a scanning signal is on, a large current flows from the P-channel MOS transistors Q4 to Q7 of the Port 2 (31-3) to N-channel MOS transistors of a Port 1 (11-2). As a result, a return signal cannot be read correctly from the keyboard switch 2, and elements of the microcomputer 31 may be damaged.

In the one-chip microcomputer system of Embodiment 5, the load MOS transistors Q8 to Q11 with large ON resistance pull up a voltage in place of the pull-up resistors while the Port 1 (11-2) is on. Therefore, the above-mentioned inconvenience is not caused.

In the one-chip microcomputer system of Embodiment 5, a period Tf is shortened, a low-impedance driving circuit can forcefully drive the input port, restrictions of impedance of pull-up resistors are eliminated, and a built-in load circuit of the one-chip microcomputer can be used. Therefore, an inexpensive and high-speed key input device can be realized.

The one-chip microcomputer system of the present invention includes a controller which performs parallel processing of scanning a keyboard switch and, driving a display device. Therefore, the one-chip microcomputer system of the present invention allows the display device to be driven with a high duty ratio.

However, a conventional system does not have a switching section for switching a method of driving an LED module. Thus, the conventional system has the is following problems.

(1) In the case where a 7-segment display module is used as a display device, when the number of driving digits increases to 8 or more, a display can be driven with a higher duty ratio by driving a display module in time division on a segment basis rather than by driving a display module in time division on a digit basis. However, the conventional system does not have a switching section for switching a method of driving an LED module. Therefore, the conventional system ends up driving a display with a low duty ratio.

In general, it is theoretically difficult to obtain a duty ratio of 1/(number of display digits) even ignoring a display blanking period, in a device which requires 8 or more display digits, when a display is performed in time division on a digit basis.

The reason why a conventional system does not have a switching section for switching a method of driving an LED module will be described below.

It is effective for cost efficiency, mass-production, and reliability to construct a display device and an key input device by using a one-chip microcomputer. However, a control program is stored in a mask ROM. Therefore, it is required to develop an optimum program and a new one-chip microcomputer, every time a keyboard matrix and a display configuration are changed.

(2) In the conventional system, a predetermined blanking period is required for preventing interference between digits of a display, so that it is difficult to extend a frame period including periods for driving a display and scanning a keyboard switch over a predetermined period. Thus, the keyboard switch cannot be scanned at a high speed.

Figure 20:
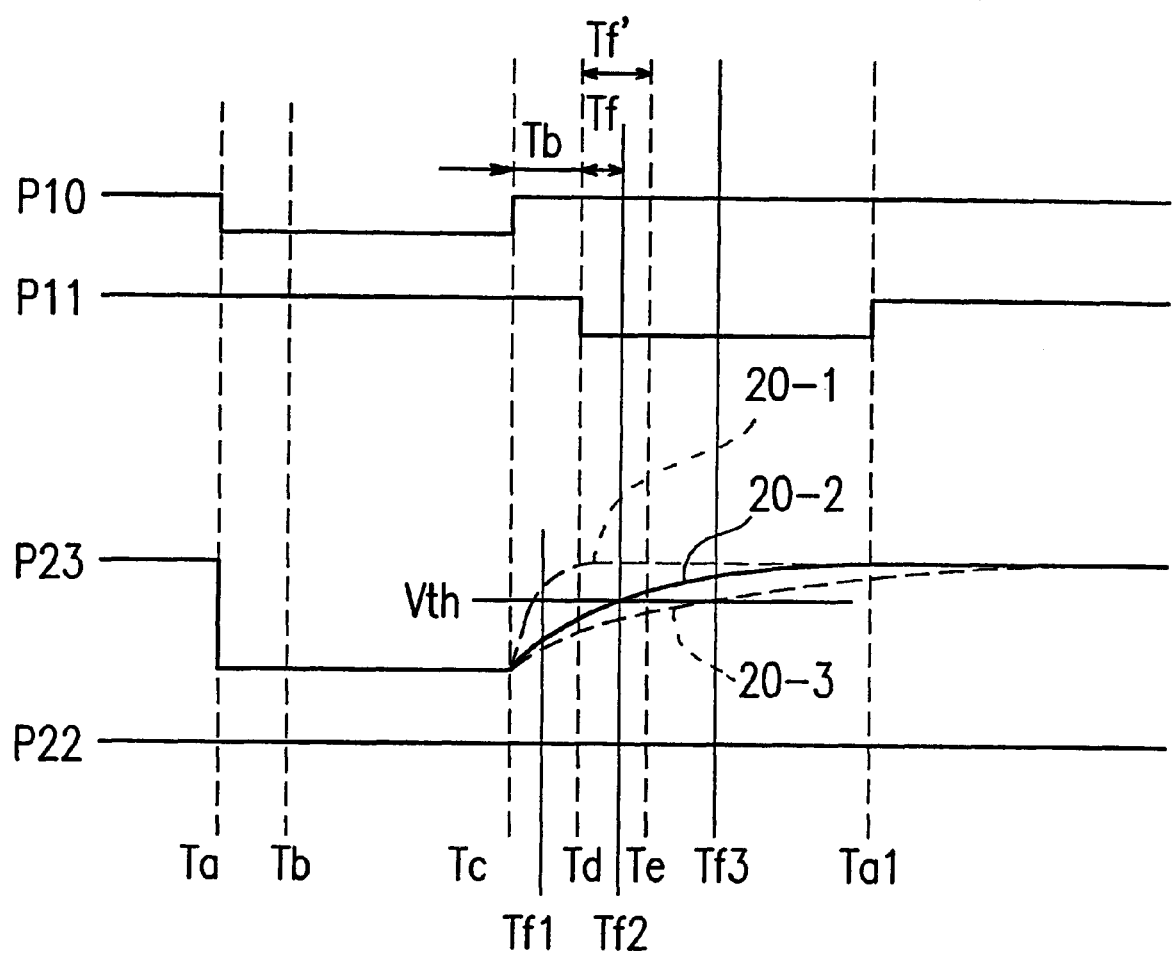
FIG. 20 shows a relationship between the time constant determined by a parasitic capacitance and a resistance of a one-chip microcomputer system and the key return signal.

Hereinafter, reasons for this will be described with reference to FIG. 20.

Figure 23:
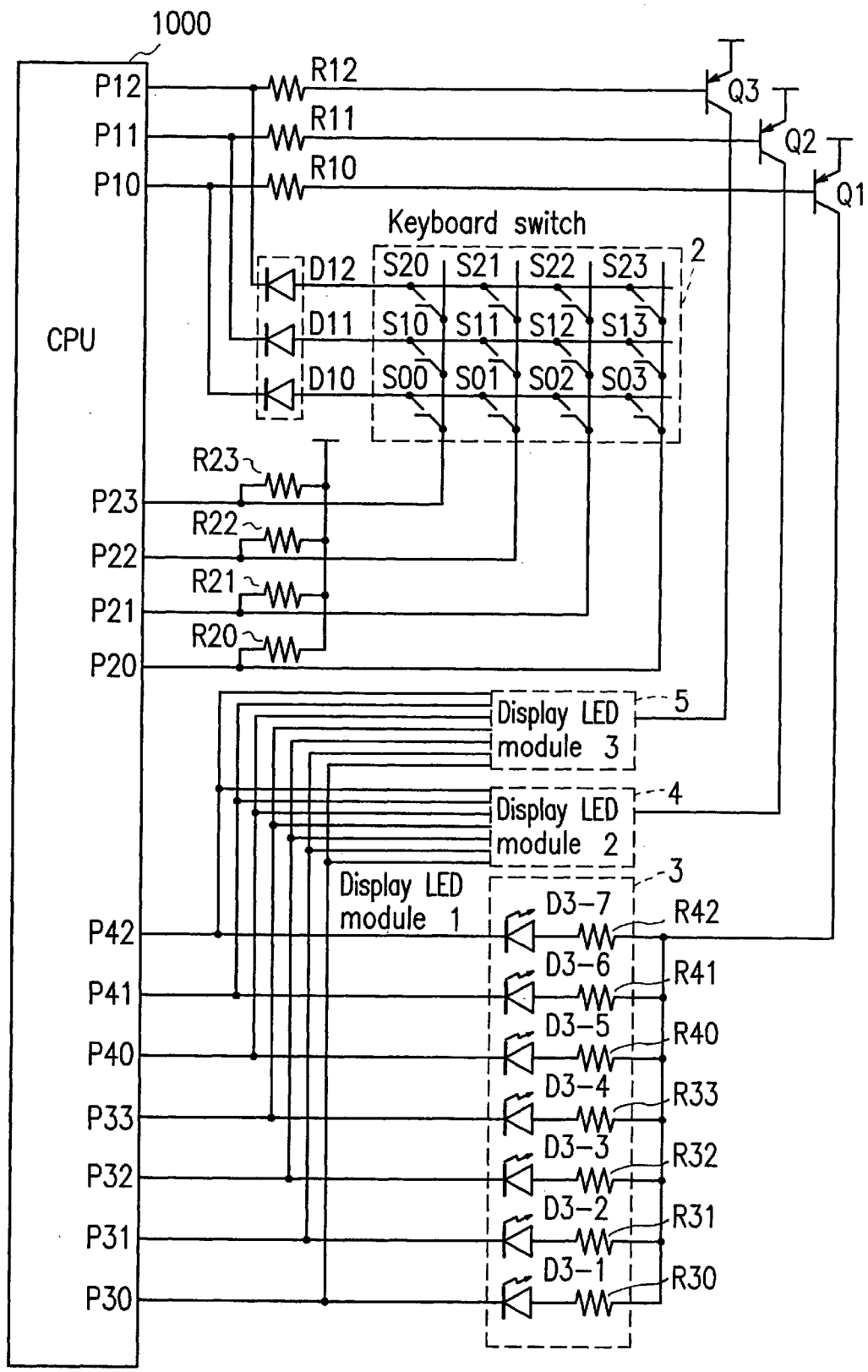
FIG. 23 is a view showing a conventional one-chip microcomputer system.

In FIG. 23, it is assumed that a key switch 800 is pressed. In FIG. 20, a scanning signal at a terminal P10 is turned on at Ta, which turns an input level of a terminal P23 low via the switch S00.

This state is completed when a scanning signal at the terminal P10 is turned off at Tc. Actually, there is a small parasitic capacitance due to lines connected to the keyboard switch 2, the display circuit (LED module), etc. Therefore, an electric potential 20-1 of the terminal P23 gradually shifts to a high level.

According to a general scanning method, a blanking period Tb during which a scanning signal received by the subsequent terminal P11 becomes high is set after Tf1 at which the electric potential reaches a threshold voltage Vth or higher.

In the case where the blanking period is not set as described above, when a relatively large parasitic capacitance is present and a capacitive component such as a capacitor is attached to a return line from the keyboard switch 2 for the purpose of preventing malfunction and parasitic emission noise due to static electricity, an electric potential at the terminal P23 increases in a gradual curve 20-3.

Even when the terminal P11 is scanned at the above-mentioned scanning timing, it is determined that an electric potential of a key return signal is at a low level. Thus, according to a routine of key data processing (for determining which switch is pressed among the keyboard switches), it may be mistakenly determined that a switch S10 is pressed.

If a blanking period is extended, a duty ratio of driving a display is decreased. If a time constant period is made long, a period from a time when key data of the last scanning line is taken in to a time when the subsequent scanning data is taken in becomes insufficient, which may result in an insufficient period of time for processing key data. Herein, the time constant is determined by a total parasitic capacitance and a pull-up resistance of the pull-up resistors R20 to R23 shown in FIG. 23. A total parasitic capacitance of the input port of a return signal from the keyboard switch 2 includes a wiring capacitance in the case where key switches are arranged in an array due to the increase in key switches, a wiring capacitance for connecting the keyboard switch 2 to the one-chip microcomputer, and a capacitance caused by using a circuit for driving a display and a signal. The time constant is referred to as a period "Tf".

Problems caused when the time constant increases will be described in detail below.

Figure 21:
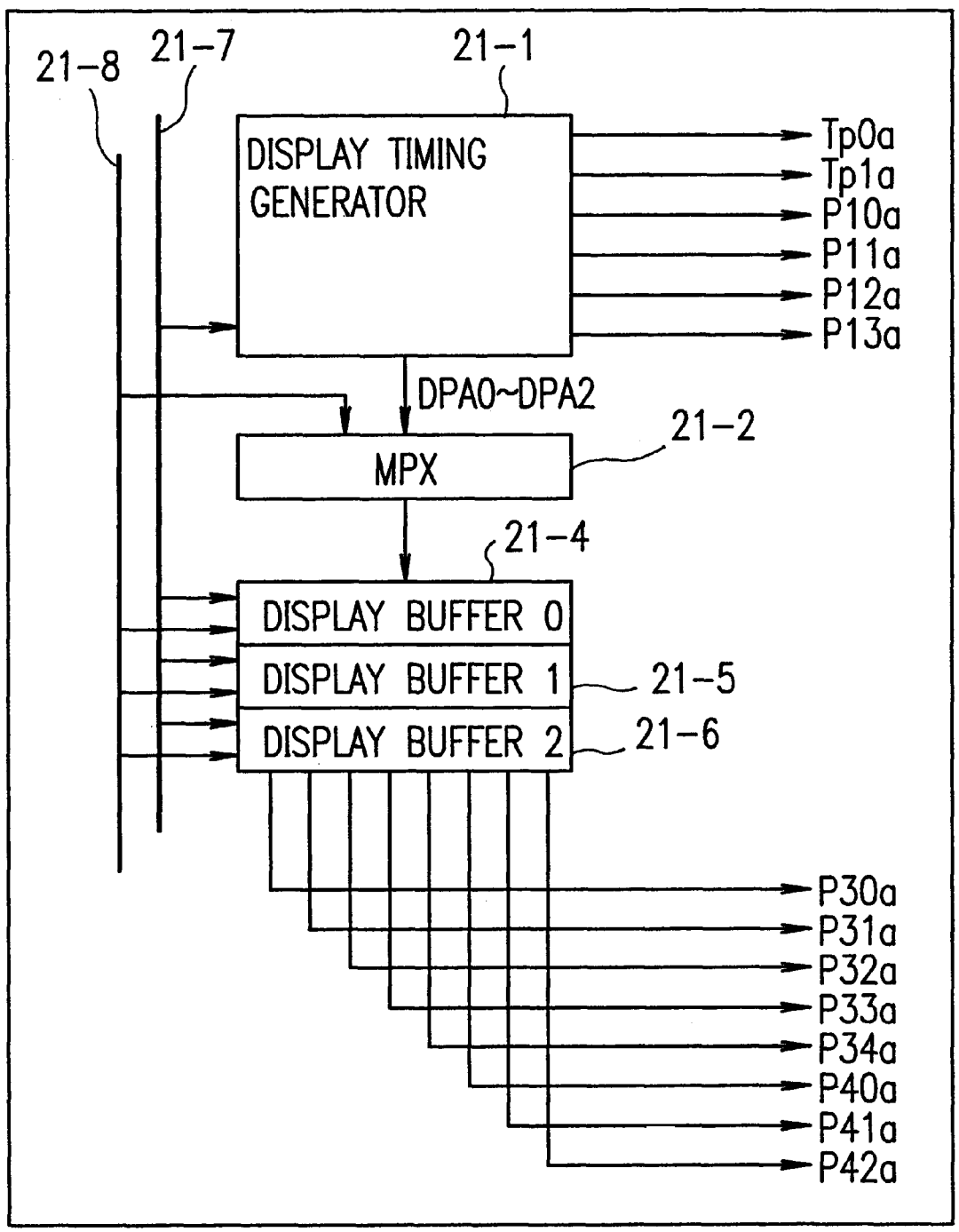
FIG. 21 is a diagram showing an example of a display control unit.

FIG. 21 is a block diagram of a display control unit in the case where a display is driven by specific hardware. Such hardware has a relatively simple circuit configuration, and has conventionally been incorporated into a chip as a peripheral module of a one-chip microcomputer for the purpose of reducing a load of software.

Referring to FIG. 21, the display control unit includes a display timing generator 21-1 for generating a display timing, a multiplexer 21-2 for multiplexing an address from a controller and pointer information signals DPA0 and DPA2 output from the display timing generator 21-1 for display buffers, and registers 21-4, 21-5, and 21-6 used as display buffers.

The display control unit is connected to a CPU through a control bus 21-8 and a data bus 21-7 containing address information so that data from the CPU can be written in the display control unit.

Select signals P10a, P11a, and P12a and segment pattern outputting signals P30a, P31a, P32a, P33a, P34a, P40a, P41a and P42a are output from the display control unit.

These output signals correspond to the select signals output from the output ports P10, P11, and P12 and the segment signals output from the segment driving ports P30, P31, P32, P33, P40, P41 and P42 shown in FIG. 23. A signal Tp0a which is an output signal from the display control unit is output at a change point of a select signal, which indicates a blanking period of a display. A signal Tp1a is output in synchronization with a signal Tp0a only at a timing at which counting of digits reaches a predetermined value and returns to the original.

Figure 22:
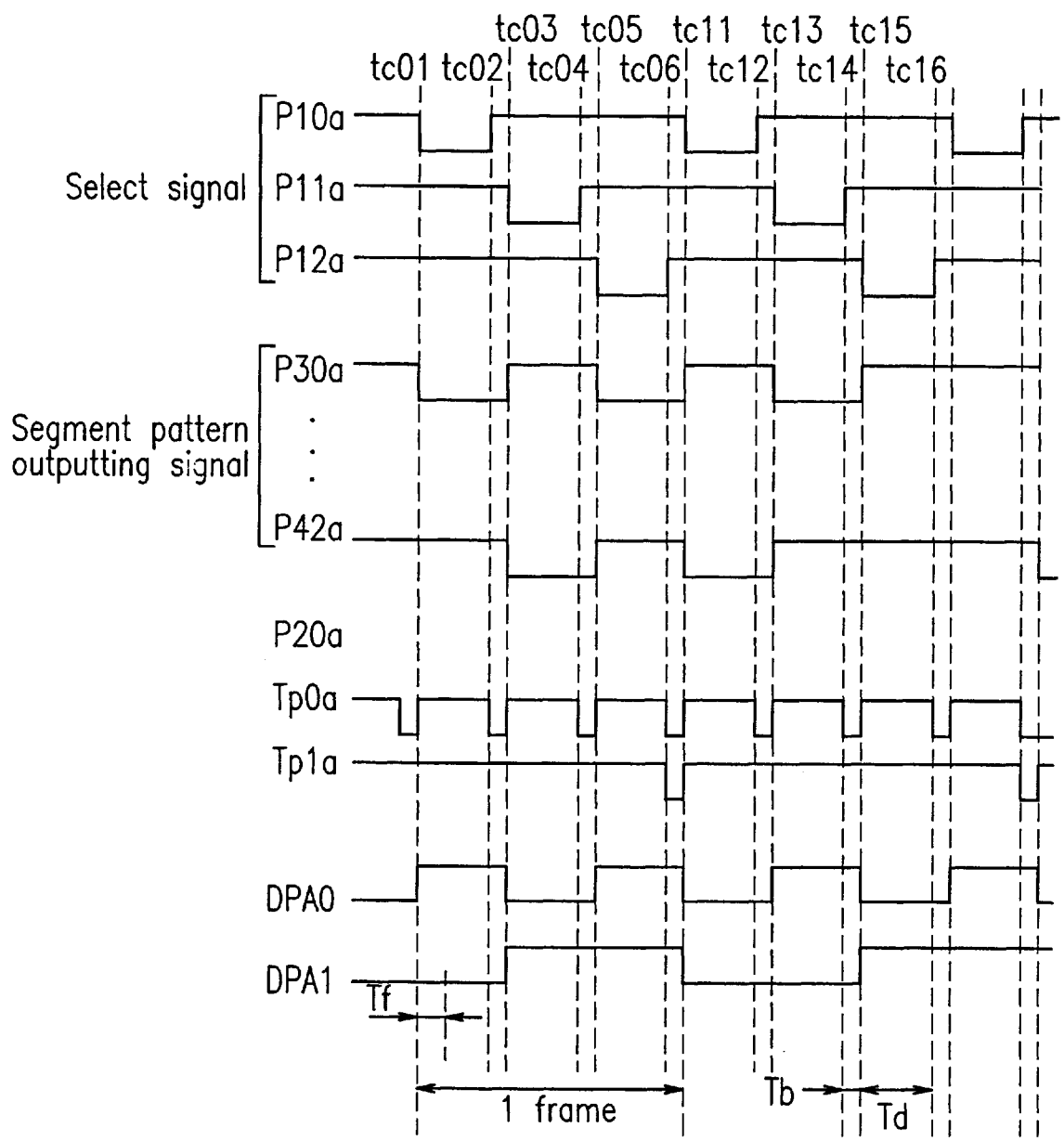
FIG. 22 is a diagram showing an operation timing of a conventional one-chip microcomputer system.

FIG. 22 shows an operation timing of the display control unit. In FIG. 22, the select signal P10a becomes active at tc01. Simultaneously, the segment pattern outputting signals P30a to P42a are read from the display buffer 21-4 shown in FIG. 21 to be output.

Next, the signal P10a becomes inactive at tc02 delayed from tc01 by a period Td. Furthermore, the signal P11a becomes active at tc03 delayed from tc02 by a period Tb, and segment pattern outputting signals P30a, P31a, P32a, P33a, P34a, P40a, P41a and P42a read from the display buffer 1 21-5 in FIG. 21 are output. This operation is repeated to perform a display.

Since a wiring capacitance in the case where key switches are arranged due to the increase in key switches, a wiring capacitance for connecting a keyboard switch to a one-chip microcomputer, and a wiring capacitance for connecting the above-mentioned display control unit to the one-chip microcomputer are present, a total parasitic capacitance becomes large.

In FIG. 23, in order to prevent a short-circuit and a malfunction of a driving circuit which outputs a scanning output of the keyboard switch 2 in the case where a plurality of key switches are simultaneously pressed, the keyboard switch 2 is generally connected to the one-chip microcomputer through the diodes D10 to D12 for protection.

In the case where one key scanning signal is turned off, the diodes D10 to D12 become high-impedance circuits due to a return signal from the keyboard switch 2. In the case where the return signal is being driven at a low level by pressing a key switch, it gradually increases at the above-mentioned time constant (determined by the total parasitic capacitance and pull-up resistance of the pull-up resistors R20 to R23).

In this case, when a return signal is read right after a scanning signal of the subsequent key switch is turned on, there is a possibility that a low level is detected irrespective of the fact that no key switches are actually pressed. In order to avoid such inconvenience, it is required that a return signal is read after the elapse of the above-mentioned period Tf after a key scanning signal is turned on.

Thus, it is difficult for the conventional system to have a port used for scanning a keyboard switch and driving a display device. The reason for this will be described below.

In recent years, in order to satisfy the demand for decreasing a cost and enhancing a function of a device under the condition of remarkable improvement of an integrated circuit technique, a one-chip microcomputer which drives a display in time division by using hardware has been developed. However, the above-mentioned period Tf is required, so that an identical output port cannot be used for driving a display and scanning a key matrix or the load of software for sharing the identical port becomes large.

As described above, a one-chip microcomputer which drives a display in time division by using hardware has been developed. However, it is difficult to scan a keyboard switch by using hardware built in a one-chip microcomputer for the following reasons: a difference in mechanical characteristics such as chattering time and bounds time of a key switch to be used, a difference in parasitic capacitance caused by arrangement and configuration of a keyboard switch, a difference in characteristics between a driving element and a circuit element receiving a return signal, a great difference in read processing of a key switch between equipment and between designers, and the like.

Furthermore, the conventional device has the following problems.

A pull-up resistor is required to be disposed outside of a one-chip microcomputer, which hinders miniaturization and cost efficiency of equipment, and high-speed key scanning.

As described above, the period Tf hinders a high-speed scanning period of a keyboard switch. In order to decrease the period Tf, a pull-up resistor with a resistance of about 50 KΩ is generally required. However, a load resistant element consisting of a MOS transistor generally has a resistance of about 70 KΩ to 130 KΩ. Therefore, a pull-up resistor is required outside of a one-chip microcomputer, which hinders miniaturization and cost efficiency of equipment, and a high speed key scanning.

According to the present invention, a part of the ports for scanning a keyboard switch is used for controlling a display, whereby scanning the keyboard switch and driving a display device are performed in parallel. In this structure, a total time required for driving a display and scanning the keyboard (i.e., total frame period) can be shortened. Therefore, a display can be driven with a high duty ratio, and the keyboard switch can be scanned at a high speed.

Furthermore, a display driving circuit for driving a display device includes a division section for time-dividing information displayed on the display device on a digit basis, a division section for time-dividing information displayed on the display device on a segment basis, and a switch for selectively switching the division sections. Therefore, when the number of segments is larger than the number of digits, a display can be driven with a higher duty ratio by time-dividing display on a segment basis, compared with the case where a display is driven in time division on a digit basis. Furthermore, a time-division display on a segment basis and a time-division display oj a digit basis can be switched. Therefore, in the case where the number of digits is smaller than that of segments, time-division driving on a digit basis as in a conventional example can be performed, and in the case where the number of digits in larger than that of the segments, time-division driving on a segment basis can be performed.

In addition, according to the above-mentioned structure, a time-division system on a digit basis or a time-division system on a segment basis can be selected, so that an identical one-chip microcomputer can be used among different equipment. Thus, display driving suitable for a display device can be selected.

Furthermore, the one-chip microcomputer system includes a counter for measuring a predetermined period of time which can be arbitrarily programmed from an ON timing of a display scanning signal supplied from the display driving circuit, and an output from the counter is detected by a CPU. According to this structure, the above-mentioned period Tf can be automatically measured by hardware (i.e., CPU) In synchronization with a change in a scanning signal of a key. Therefore, the structure of software can be simplified, and productivity thereof can be enhanced.

Furthermore, the one-chip microcomputer system of the present invention includes: a memory for storing a key return signal output from the keyboard switch, not through the CPU; an interrupt signal generator for generating an interrupt signal for informing the CPU of the key return signal being stored in the memory; and an interrupt generator for generating an interrupt when a key scanning of the keyboard switch is completed over one frame. According to this structure, a return signal from the keyboard switch during one frame of scanning of the keyboard switch can be read by the CPU, so that a CPU load and a development burden of software can be reduced.

In addition, according to the above-mentioned structure, an interrupt is generated by the CPU per scanning of the keyboard switch, whereby special keyboard scanning processing becomes possible. Furthermore, if interrupt processing per scanning of the keyboard switch is made divertible to an interval timer, an application range of hardware of the microcomputer is not required to be dedicated to scanning of the keyboard switch. Therefore, flexibility (i.e., degrees of design freedom) of the one-chip microcomputer system can be enhanced. As a result, a mask ROM required for scanning the keyboard switch can be omitted, and an inexpensive control device of a display key which enables high-speed processing can be realized.

Furthermore, the one-chip microcomputer system of the present invention includes a driving circuit for forcefully driving an input port for a key return signal from the keyboard switch at a non-active level during an OFF period of a key scanning signal and an electric potential fixing unit for fixing an input level of high-impedance input. According to this structure, a period Tf in shortened as is apparent from the embodiments described above. In addition, a low-impedance driving circuit can forcefully drive the input port, restrictions of impedance of pull-up resistors are eliminated, and a built-in load circuit of the one-chip microcomputer can be used. Therefore, an inexpensive and high-speed key input device can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A one-chip microcomputer system, comprising:

a display driving circuit for driving a display device;

a scanning circuit for outputting a key scanning signal to scan a keyboard switch;

a common port used for scanning the keyboard switch and driving the display device;

a controller for controlling parallel processing of scanning the keyboard switch and driving the display device; and wherein a display select or driving signal is output via the common port.

2. A one-chip microcomputer system according to claim 1, wherein the display driving circuit includes a division section for time-dividing information displayed on the display device on a digit basis and a division section for time-dividing information displayed on the display device on a segment basis, and the system further includes a switch for selectively switching the division sections.

3. A one-chip microcomputer system according to claim 1, further comprising a counter for measuring a predetermined period of time from an ON timing of a display scanning signal output from the display driving circuit, wherein the controller detects an output signal from the counter.

4. A one-chip microcomputer system according to claim 3, comprising:

a memory for storing a key return signal output from the keyboard switch, not through the controller;

an interrupt signal generator for generating an interrupt signal for informing the controller of the key return signal being stored in the memory; and an interrupt generator for generating an interrupt when a key scanning of the keyboard switch is completed over one frame.

5. A one-chip microcomputer system according to claim 1, comprising:

an input port for receiving the key return signal from the keyboard switch;

a driving circuit for forcefully driving the input port at a non-active level, when the key scanning signal is in an OFF state; and an electric potential fixing unit for fixing an input level of the input port.

6. The system of claim 1, wherein a single frame time includes both reading return signal from the keyboard switch and changing a state of at least one display driving port.

7. A one-chip microcomputer system, comprising:

a display driving circuit for driving a display device;

a scanning circuit for outputting a key scanning signal to scan a keyboard switch;

a common port used for scanning the keyboard switch and driving the display device;

a controller for controlling parallel processing of scanning the keyboard switch and driving the display device; and wherein a single frame time includes both reading a return signal from the keyboard switch and changing a state of at least one display driving port.

8. A one-chip microcomputer system, comprising:

a display driving circuit for driving a display device;

a scanning circuit for outputting a key scanning signal to scan a keyboard switch;

a common port used for scanning the keyboard switch and driving the display device;

a controller for controlling parallel processing of scanning the keyboard switch and driving the display device; and wherein the key scanning signal is output via the common port.

9. A one-chip microcomputer system, comprising:

a display driving circuit for driving a display device;

a scanning circuit for outputting a key scanning signal to scan a keyboard switch;

a common port used for scanning the keyboard switch and driving the display device;

a controller for controlling parallel processing of scanning the keyboard switch and driving the display device; and wherein the display driving circuit includes a first division section for time-dividing information displayed on the display device on a digit basis and a second division section for time-dividing information displayed on the display device on a segment basis, and the system further includes a switch for selectively switching the first and second division sections.

10. A one-chip microcomputer system, comprising:

a display driving circuit for driving a display device;

a scanning circuit for outputting a key scanning signal to scan a keyboard switch;

a common port used for scanning the keyboard switch and driving the display device;

a controller for controlling parallel processing of scanning the keyboard switch and driving the display device;

wherein the key scanning signal is output via the common port; and wherein the display driving circuit includes a first division section for time-dividing information displayed on the display device on a digit basis and a second division section for time-dividing information displayed on the display device on a segment basis, and the system further includes a switch for selectively switching the first and second division sections.

* * * * *